(12) United States Patent
Price et al.

(10) Patent No.: US 7,596,323 B1
(45) Date of Patent: Sep. 29, 2009

(54) OPTICAL COMMUNICATIONS SYSTEMS, DEVICES, AND METHODS

(75) Inventors: Alistair J. Price, Ellicott City, MD (US); Bassel F. Beidas, Alexandria, VA (US); Terry L. Bittner, Woodbine, MD (US); A. Roger Hammons, Jr., North Potomac, MD (US); William M. Kirschner, Mount Airy, MD (US); Daniel F. McAlister, Aloha, OR (US); Shou Y. Mui, Ellicott City, MD (US)

(73) Assignee: Broadwing Corporation, Austin, TX (US)

( * ) Notice: Subject to any disclaimer, the term of this patent is extended or adjusted under 35 U.S.C. 154(b) by 633 days.

(21) Appl. No.: 11/324,936

(22) Filed: Jan. 4, 2006
(Under 37 CFR 1.47)

Related U.S. Application Data

(60) Provisional application No. 60/694,321, filed on Jun. 27, 2005, provisional application No. 60/694,335, filed on Jun. 27, 2005, provisional application No. 60/694,336, filed on Jun. 27, 2005.

(51) Int. Cl.
*H04B 10/12* (2006.01)
*H04J 14/00* (2006.01)

(52) U.S. Cl. .................. 398/141; 398/76; 398/202; 398/208; 398/212; 398/214; 398/140; 398/152; 398/182; 398/183

(58) Field of Classification Search .......... 398/182, 398/183, 184, 185, 186, 188, 76, 25, 28, 398/29, 202, 208, 212, 214, 140, 141, 152
See application file for complete search history.

(56) References Cited

U.S. PATENT DOCUMENTS

| | | | | |
|---|---|---|---|---|
| 6,032,284 A | * | 2/2000 | Bliss | 714/792 |
| 6,118,566 A | | 9/2000 | Price | |
| 6,344,922 B1 | | 2/2002 | Grubb et al. | |
| 6,449,073 B1 | | 9/2002 | Huber | |
| 6,754,448 B2 | * | 6/2004 | Fuse | 398/43 |
| 7,194,025 B2 | * | 3/2007 | Wood et al. | 375/231 |
| 7,301,997 B1 | * | 11/2007 | Wang et al. | 375/232 |
| 2002/0186435 A1 | * | 12/2002 | Shpantzer et al. | 359/136 |

FOREIGN PATENT DOCUMENTS

| | | | |
|---|---|---|---|
| EP | 860962 A2 | * | 8/1998 |
| WO | WO 01/54425 | | 7/2001 |

* cited by examiner

*Primary Examiner*—Ken N Vanderpuye
*Assistant Examiner*—Daniel G Dobson
(74) *Attorney, Agent, or Firm*—Thorp Reed & Armstrong, LLP

(57) ABSTRACT

A method and apparatus for estimating fiber dispersion in an optical communication system including transmitting an optical signal carrying a unique word along an optical communication path, receiving the optical signal carrying the unique word from the optical communication path, producing an electrical signal corresponding to the received unique word, and processing the electrical signal corresponding to the received unique word to produce an estimate of the fiber dispersion in the optical communication system.

2 Claims, 14 Drawing Sheets

OPTICAL COMMUNICATIONS SYSTEMS, DEVICES, AND METHODS

CROSS-REFERENCE TO RELATED APPLICATIONS

This application is related to U.S. Provisional Patent Application Ser. No. 60/694,321, filed Jun. 27, 2005 and U.S. Provisional Patent Application Ser. No. 60/694,335, filed Jun. 27, 2005, and U.S. Provisional Patent Application Ser. No. 60/694,336, filed Jun. 27, 2005, all of which are incorporated herein by reference.

STATEMENT REGARDING FEDERALLY SPONSORED RESEARCH OR DEVELOPMENT

Not Applicable.

BACKGROUND OF THE INVENTION

The present invention is directed generally to the transmission of signals in optical communications systems. More particularly, the invention relates to systems, devices, and methods for dispersion compensation, for estimating and controlling the optical source frequency, and for estimating and controlling the optical source frequency in optical communication systems.

The development of digital technology provided the ability to store and process vast amounts of information. While this development greatly increased information processing capabilities, it was soon recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical signal. In most optical transmission systems the information is imparted by using an electrical data stream either to directly modulate an optical source or to externally modulate an optical carrier so that the information is carried at the frequency of the optical carrier, or to modulate the information onto one or more subcarriers or sidebands, with the later technique sometimes called sub-carrier modulation ("SCM").

Initially, modulated optical signals were spatially separated by placing each optical signal on a different fiber to provide space division multiplexing ("SDM") of the information in optical systems. As the demand for capacity grew, increasing numbers of information data streams were spaced in time, or time division multiplexed ("TDM"), on the single optical signal in the SDM system as a means to better use the available bandwidth. The continued growth in demand has spawned the use of wavelength division multiplexing ("WDM") to transport multiple optical signals on a single fiber. In WDM systems, further increases in transmission capacity can be achieved not only by increasing the transmission rate of the information on each wavelength, but also by increasing the number of wavelengths, or channels, in the system.

As the transmission rate of the data increase, chromatic and polarization mode dispersion ("PMD") cause the signal to degrade thereby limiting data transmission rates and distances. One solution to the dispersion problem is to use dispersion compensating fiber. This increases the cost of the system and only allows for a fixed amount of compensation. If the dispersion changes over time, it is difficult to change the amount of dispersion compensating fiber to compensate for the change. PMD arises in optical systems when the different polarization modes propagate through the system with different group velocities. Dispersion compensating fiber does not independently compensate for PMD. Therefore, there remains a need to provide inexpensive and more flexible dispersion compensation in order to increase optical communication transmission rates and distances.

In addition, to further increase the data carrying capacity of optical communication systems, dense wavelength division multiplexing ("DWDM") has been developed where multiple closely spaced wavelengths carry information. As the signal data rates increase, dispersion of the optical signal limits the transmission range before a signal must be converted to an electrical signal and regenerated as an optical signal.

A number of solutions have been used to overcome dispersion in DWDM systems. One solution is to use low dispersion fiber in the system. One problem with this approach is that low dispersion fiber has a low dispersion characteristic only in a limited range of wavelengths, so in systems transmitting a large number of channels, the dispersion is low for only a small number of wavelengths. Dispersion compensation fiber is expensive, and in many systems, existing fiber plants must be used. Another solution is to use dispersion compensating fiber ("DCF"), which applies a dispersion characteristic to the optical signal to counter the dispersion induced in the system. Again, DCF is expensive. Also, over time the dispersion characteristics of the system may change and this would require a changing the DCF used for compensation, which would be expensive and labor intensive. In addition to the problems described above, low dispersion fiber and DCF do not correct of polarization mode dispersion. One way to correct of for polarization mode dispersion is the carefully control the polarization of the optical signal, but the various methods for doing this are expensive and add complexity to the system.

As the wavelength spacing in DWDM systems decrease, it is necessary to more carefully control the transmit wavelength of the optical sources. Typically, an optical communication system will attempt to lock the optical source to the required wavelength by measuring the wavelength of the source and then adjusting the optical source to the correct wavelength. It is easier and quicker to lock optical sources with low phase noise and less temperature sensitivity, but these types of optical sources are expensive. Less expensive optical sources are available, but they have greater temperature sensitivity and phase noise making it more difficult to lock them to a specific wavelength using typical methods.

Because of the problems described above there remains a need to provide an optical communication system that effectively and inexpensively compensates for the effects of dispersion, including polarization mode dispersion. There is a further need to be able to compensate for the dispersion as the system changes over time without costly modification to the system. In addition, there remains a need for an optical communication system that uses less expensive optical sources that have greater wavelength drift and phase noise, but still allows for high speed DWDM data transmission.

Furthermore, in optical communication systems, optical sources are used by receivers to demodulate data carrying optical signals. In order to properly demodulate the data carrying optical signal, the receiver optical source frequency should be the same as the transmitter optical source frequency. This requires that the receiver optical source transmission frequency be carefully controlled to allow for proper demodulation and to avoid crosstalk and interference between adjacent wavelengths. Very stable and accurate optical sources are expensive, therefore it is desirable to use lower cost optical sources in receivers that may be controlled. One problem with lower cost optical sources is phase noise. Current methods of estimating optical source frequency and control take too much time to carry out and are corrupted by phase noise. Therefore, there remains a need to provide an accurate estimate of the receiver optical source frequency in the presence of phase noise.

BRIEF SUMMARY OF THE INVENTION

In one embodiment, the present invention includes a method of estimating fiber dispersion in an optical communication system including transmitting an optical signal carrying a unique word along an optical communication path, receiving the optical signal carrying the unique word from the optical communication path, producing an electrical signal corresponding to the received unique word, and processing the electrical signal corresponding to the received unique word to produce an estimate of the fiber dispersion in the optical communication system.

In another embodiment, the present invention includes a method wherein transmitting includes coherently modulating the unique word onto the optical signal.

In another embodiment, the present invention includes a method wherein producing the electrical signal includes coherently demodulating the optical signal into an electrical signal.

In another embodiment, the present invention includes a method wherein producing the electrical signal includes producing two electrical signals corresponding to different optical polarizations in the optical signal.

In another embodiment, the present invention includes a method wherein transmitting includes modulating the unique word onto a subcarrier.

In another embodiment, the present invention includes a method wherein another unique word is modulated onto another subcarrier.

In another embodiment, the present invention includes a method wherein transmitting a signal carrying data along an optical communication medium, receiving the signal carrying the data from the optical communication medium, producing an electrical signal corresponding to the received data, and compensating the received data for fiber dispersion based upon the estimated fiber dispersion.

In another embodiment, the present invention includes a method of compensating for fiber dispersion in an optical communication system including estimating the fiber dispersion in an optical communication system, transmitting a signal carrying data along an optical communication medium, receiving the signal carrying the data from the optical communication medium, producing an electrical signal corresponding to the received data, and compensating the received data for fiber dispersion based upon the estimated fiber dispersion.

In another embodiment, the present invention includes apparatuses for performing one or more the methods disclosed herein.

In another embodiment, the present invention includes a method of transmitting data in an optical network including coherently modulating N input data signals onto subcarriers of an optical signal using differential phase modulation, transmitting the optical signal along a communication path, receiving the optical signal from the optical communication path, producing first and second polarization optical signals, coherently demodulating the first and second polarization signals into 2N electrical signals, sampling the 2N electrical signals resulting in digital symbols representing the in-phase and quadrature components of the 2N electrical signals, and differentially phase detecting the digital symbols to produce N output data signals.

In another embodiment, coherently modulating includes modulating the data signals onto electrical subcarriers and then modulating the electrical subcarriers onto the optical signal subcarriers.

In another embodiment, some of the subcarriers are above the optical signal carrier and the rest are below the optical signal carrier.

In another embodiment, differential phase modulation is selected from the group of DQPSK modulation and DOQPSK modulation.

In another embodiment, sampling occurs at twice the modulated symbol rate.

In another embodiment, sampling occurs at less than twice the modulated symbol rate.

In another embodiment, the present invention includes interpolating the sampled data.

In another embodiment, the present invention includes interpolating results in an interpolated data rate twice the modulated symbol rate.

In another embodiment, differentially detecting includes separately differentially detecting the N first and the N second polarization signals and combining detected first and second polarization signals into N symbol decisions.

In another embodiment, the present invention includes filtering the 2N electrical signals after coherently demodulating.

In another embodiment, the present invention includes dispersion compensating the 2N sampled electrical signals.

In another embodiment, the dispersion compensation is based upon an estimate of optical network dispersion.

In another embodiment, the present invention includes including a unique word with the input data signal, correlating the unique word data after differential detection, constant false alarm rate processing the correlated unique word data, and estimating the optical network dispersion from the processed unique word data.

In another embodiment, the present invention includes coherently integrating the correlated unique word data.

In another embodiment, the present invention includes separately gain correcting the N first and N second polarization electrical signals.

In another embodiment, the present invention includes separately timing and phase correcting the N first and N second polarization electrical signals.

In another embodiment, the present invention includes a method of acquiring a signal in an optical communication system including transmitting an optical signal modulated with a unique word on an optical communication path using differential phase modulation, receiving the optical signal producing an electrical signal modulated with the unique word, converting the electrical signal from analog to digital, differentially detecting the electrical signal, correlating the detected electrical signal against the unique word, integrating the correlated signal, normalizing the correlated signal, and estimating communication system characteristics.

In another embodiment, the present invention includes a method of signal tracking in a coherent optical communication system including estimating communication system characteristics, transmitting payload data, receiving transmitted payload data, compensating the received payload data based upon the estimated system characteristics, transmitting a unique word, receiving the unique word, and processing the unique word to update the estimated communication system characteristics.

In another embodiment, the present invention includes an apparatus for performing one or more of the methods disclosed herein.

In another embodiment, the present invention includes a method of estimating the frequency of an optical source in an optical communication system including differentially phase modulating a signal with a unique word, transmitting the signal along an optical communication path, coherently receiving the signal carrying the unique word from the optical communication path, converting the received signal from an analog signal to a digital signal, differentially demodulating the received signal, correlating the received signal, and calculating the optical source frequency.

In another embodiment, the present invention includes coherently receiving the signal includes producing I and Q signals.

In another embodiment, the present invention includes calculating the optical source frequency further includes calculating a coarse estimate of the optical source frequency.

In another embodiment, differentially phase modulating includes modulating a plurality of signals with a unique word onto a plurality of subcarriers, correlating the received signals includes detecting the received signals, and calculating a coarse estimate of the optical source frequency includes determining if N of the subcarriers received signals are detected and determining a coarse frequency offset from the pattern of detected subcarrier receive signals.

In another embodiment, calculating the optical source frequency further includes calculating a fine estimate of the optical source frequency.

In another embodiment, calculating the fine estimate of optical source frequency includes taking the arctangent of the peak detection I and Q values.

In another embodiment, calculating the optical source frequency further includes calculating a fine estimate of the optical source frequency.

In another embodiment, calculating the fine estimate of optical source frequency includes taking the arctangent of the peak detection I and Q values.

In another embodiment, the present invention includes an apparatus for performing one or more of the methods described herein.

Those and other embodiments of the present invention will be described in the following detailed description. The present invention addresses the needs described above in the description of the background of the invention by providing improved systems, apparatuses, and methods. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

Figure 1:
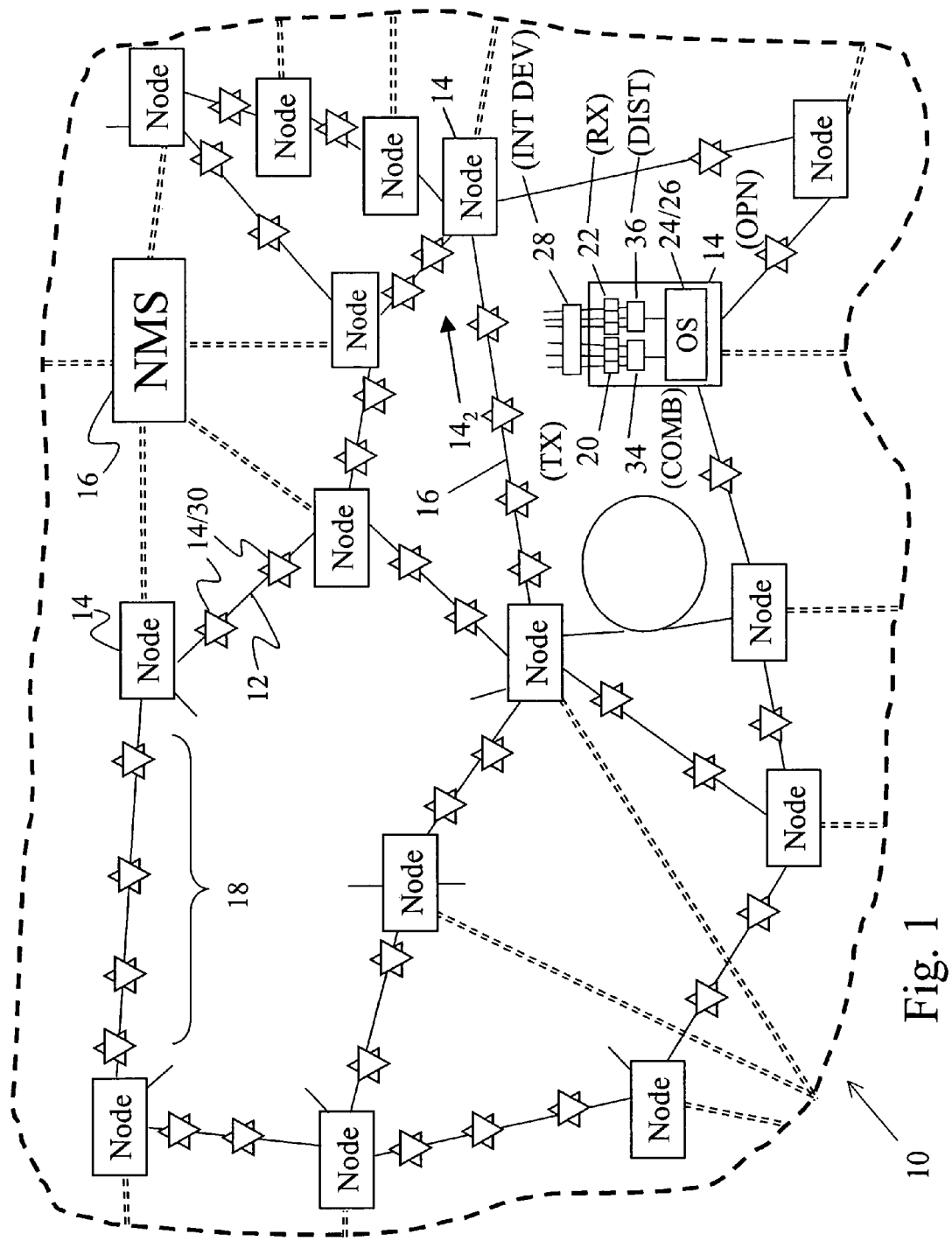
FIGS. 1 and 2 show examples optical communications systems.

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted fiber ("DSF"), non-dispersion shifted fiber ("NDSF"), non-zero dispersion shifted fiber ("NZDSF"), dispersion compensating fiber ("DCF"), polarization maintaining fiber ("PMF"), single mode fiber ("SMF"), multimode fiber ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel.

One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 09/817,478, filed Mar. 26, 2001 and U.S. Pat. No. 6,344,922 issued Feb. 5, 2002, 1999, both of which are incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. Patent Application Ser. No. 60/177,625, filed Jan. 24, 2000, and PCT Patent Application PCT/US01/02320, filed Jan. 24, 2001, both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides a coherent optical carrier and can utilize, for example, narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. Pat. No. 6,449,073, which is incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and an interfacial switch 24 portion, such that some signals are switched without an O-E-O conversion, while other signals are subjected to an O-E-O conversion. Switches 24 can have many forms and variations. For example, in addition to being integrated or dedicated, and having an optical and/or electrical switch fabric, a switch 24 can be polarization-sensitive or polarization-insensitive.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths $\lambda_i$ in the optical systems 10.

Figure 2:
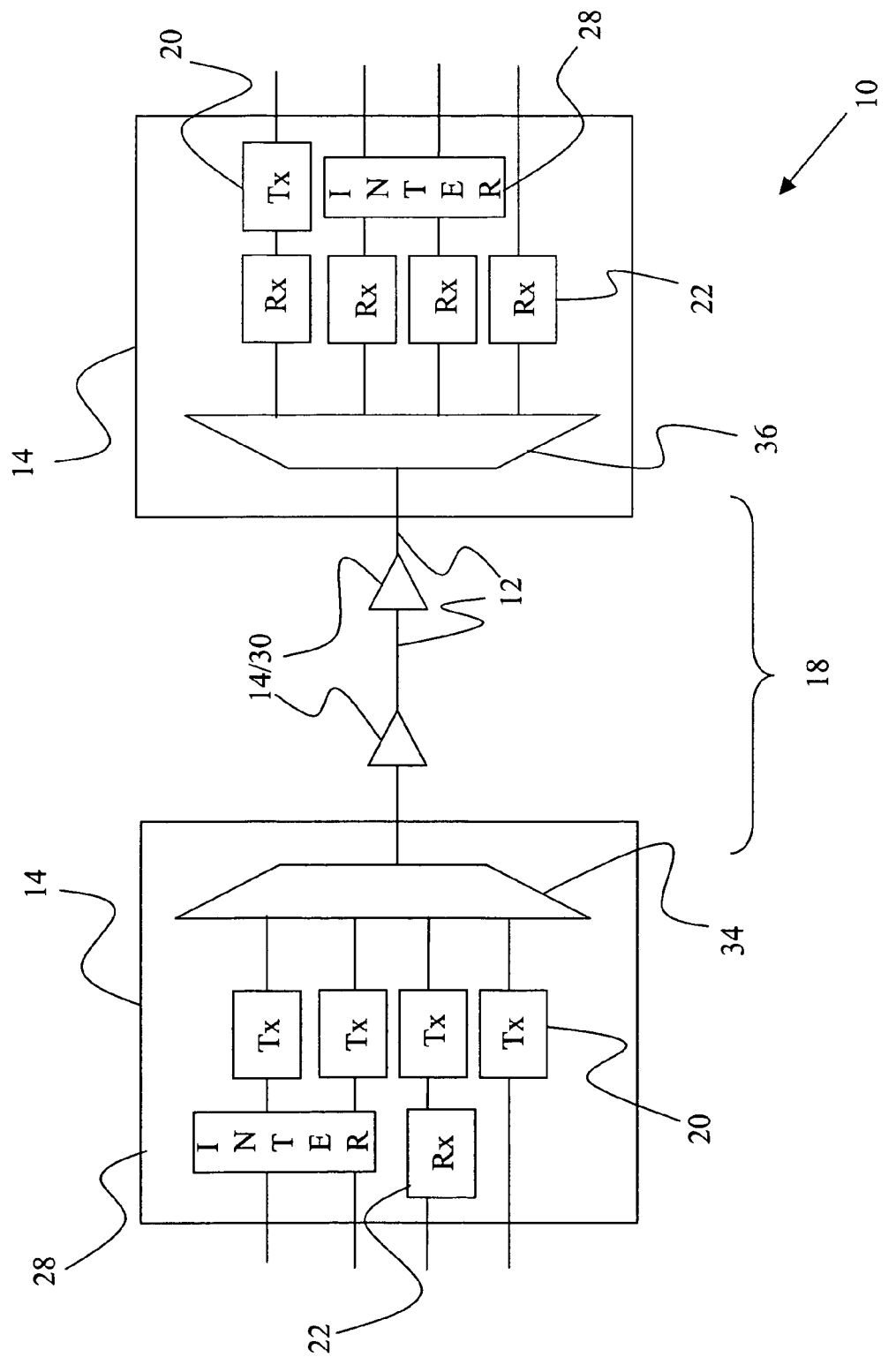

FIG. 2 illustrates another embodiment of the system 10 including a link 18 of four nodes and network elements 14. That link 18 can be, for example, all or part of a point to point system, or it may be part of a multi-dimensional, mesh, or other system. One or more of the nodes or network elements 14 can be connected directly to the network management system 16 (not shown). If the link 18 is part of a larger system, then as few as none of the nodes or network elements 14 can be connected to the network management system 16 and all of the nodes and network elements 14 can still be indirectly connected to the NMS 16 via another node or network element 14 in the larger system 10.

Figure 3:
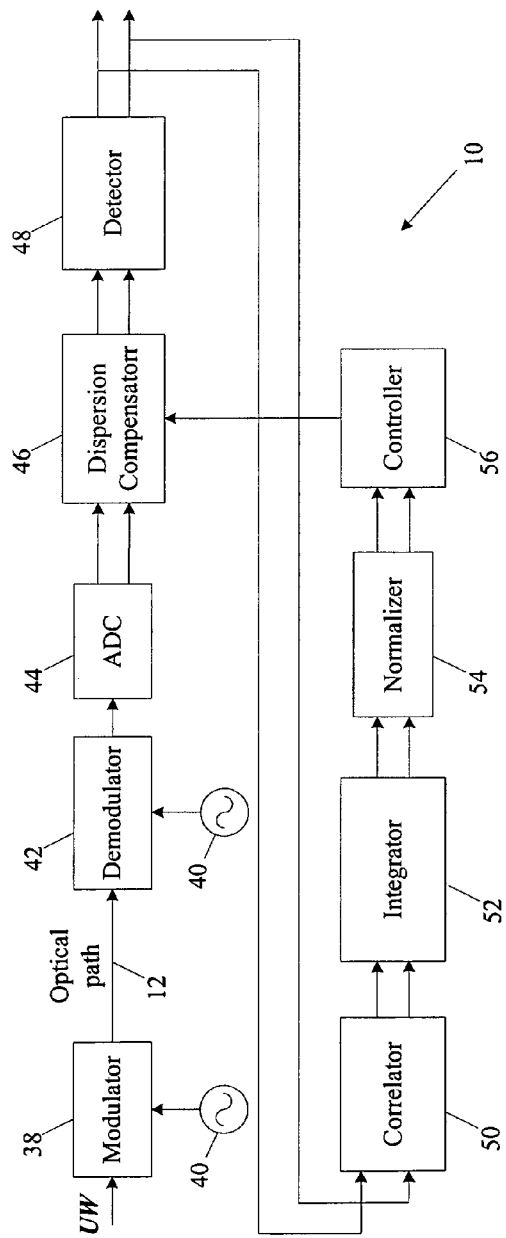
FIG. 3 shows an optical communication system with dispersion equalization according to the present invention.

FIG. 3 shows one embodiment of an optical communication system 10 which can provide dispersion compensation according to the present invention. The system 10 includes a modulator 38 and a demodulator 42 connected by an optical path 12. The optical path 12 may include other components and devices between the modulator 38 and demodulator 42, such as amplifiers, switches, add/drop devices, and other devices as described hereinabove. Typically, the modulator 38 is part of a transmitter 20 and the demodulator 42 and subsequent parts of the system 10 are part of a receiver 22. An analog-to-digital converter (ADC) 44 converts the demodulated signal into a digital signal that is further processed by other devices to estimate and compensate for dispersion in the system 10, as described in more detail hereinbelow.

The modulator 38 receives input data and coherently modulates the input data onto an optical carrier from an optical source 40. The input data may be in a standard or non-standard format, and may include information in addition to payload data, such as error correction encoding, a "unique word" ("UW"), or other non-payload data. The UW, for example, may be a series of data bits included in a transmission frame that are processed to estimate the dispersion in the system 10. The length of the UW and pattern of the bits in the UW are selected to provide an estimate of the dispersion with a desired accuracy within the processing capabilities of the system. The modulator 38 may use various modulation techniques for modulating the input data onto the optical carrier. For example, the input data may be directly modulated onto an optical carrier or the input data may be subcarrier modulated. For example, the input data may be subcarrier modulated by modulating the input data onto an electrical carrier that is then modulated onto the optical carrier resulting in optical subcarrier modulation. In another embodiment, the input data may be subcarrier modulated by putting the input data into a particular format or code, such as by Manchester encoding the input data. The modulator 38 may also utilize various forms of amplitude, frequency, phase, or other modulation techniques to modulate the data. The transmitter 20 may also include filters, combiners, signal processing, and other components and systems.

The optical path 12 connected to the modulator receives and carries the modulated optical signal from the modulator 38 to the demodulator 42. The optical path 12 may include guided and unguided transmission media. Optical fibers are a common optical path 12, especially in long distance, high data rate optical communication systems 10. The optical path 12 may induce dispersion in the optical signal, especially at high data rates, that limits the data rate and/or transmission distance of the system 10. The present invention compensates for this and other dispersion in the system 10. Dispersion compensating fiber (DCF) is sometimes used to reduce the effects of dispersion in the system 10 and the present invention may be utilized with or without DCF to further reduce the effects of dispersion in the system 10.

The demodulator 42 receives the optical signal from the optical path 12. The demodulator 42 uses a laser source 40 to coherently demodulate the optical signal. Coherent demodulation preserves the phase of the signal received and allows for the demodulated signal to be coherently processed.

The ADC 44 receives and samples the demodulated signal and converts the analog signal into in-phase ("I") and quadrature ("Q") digital signals. In one embodiment, the sampling rate is at least twice the symbol rate of the data signal. The ADC 44 may use a sampling rate of at least twice the symbol rate, or the ADC 44 may oversample or undersample the analog signal. Typically, if the signal is undersampled, some of the data may be lost. The undersampled signals may be reconstructed by interpolating the samples according to the present invention. Interpolating the undersampled I and Q signals according the present invention can result in data samples at a rate greater than the capability of available ADCs.

The dispersion compensator (DC) 46 receives the I and Q signals and compensates for dispersion in the signal. The DC 46 may provide one or more types of compensation, such as linear or nonlinear compensation, and the DC 46 may be controlled to compensate for different levels of dispersion. One example of a linear DC 46 implementation uses a digital finite impulse response (FIR) filter. The FIR filter has inputs that receive filter coefficients to control the response of the FIR filter. The DC 46 has different DC settings resulting in specified levels of compensation. Each DC setting has a corresponding set of FIR filter coefficients that are input to the FIR filter resulting in the desired dispersion compensation. The filter coefficients may be stored or calculated. When the DC 46 is commanded to provide a specific dispersion compensation, the DC 46 selects the filter coefficients corresponding to the DC setting and applies those filter coefficients to the FIR filter. This allows the DC 46 to compensate for the dispersion as found in various systems and channels and as dispersion varies over time. Other implementations for the DC may be used with either linear or nonlinear compensation.

The detector 48 receives the dispersion compensated signal from the DC 46 and detects and produces a corresponding data signal. The output from the detector 48 may be sent to the end user or it may be further processed or re-transmitted to another location. The output from the detector 48 is also sent to the UW correlator 50 and is used to control the DC 46.

A UW correlator 50 receives the detected signal from the detector 48, correlates the detected signal with a predetermined impulse response related to the UW, and produces output indicative of the correlation. The UW correlator output indicates the effectiveness of the dispersion compensation applied by the DC 46. Typically, as dispersion compensation of the DC 46 approaches equalization of the actual dispersion, the correlation metric increases. Conversely, as the dispersion compensation of the DC 46 moves away from equalization of the actual dispersion, the correlation metric decreases. The correlation metric is discussed in more detail herein below with respect to FIG. 4.

The frame-to-frame integrator 52 integrates the UW correlator outputs from frame-to-frame for a given DC setting and provides a more accurate indication of the dispersion estimation performance than can typically be achieved with the analysis of correlator 50 data from a single or small number of frames. The frame-to-frame integration improves the dispersion estimation performance by increasing the signal to noise ratio.

The normalizer 54 receives and normalizes the output of the integrator 52. In one embodiment, the normalizer 54 determines the total energy in the received signal and normalizes the integrator 52 output based upon the total energy. Normalization allows for a single constant false alarm rate decision threshold to be used. In another embodiment of a normalizer 54, automatic gain control (AGC) is used to normalize the integrator 52 output. The AGC maintains a constant gain value for the integrator 52 output. The AGC gain value is based upon the level of the total energy received. In another embodiment of a normalizer 54, constant false alarm rate (CFAR) processing is performed, such as by calculating the energy in the integrated signal, and then dividing each data point in the integrated signal by the calculated energy value.

The dispersion controller 56 receives the output of the normalizer 54 and estimates the uncompensated dispersion in the channel. Based upon the current dispersion estimate, the dispersion controller 56 controls the DC 46. A more detailed description of the operation of the dispersion controller 56 will follow below when the overall operation of the system is described.

Figure 4:
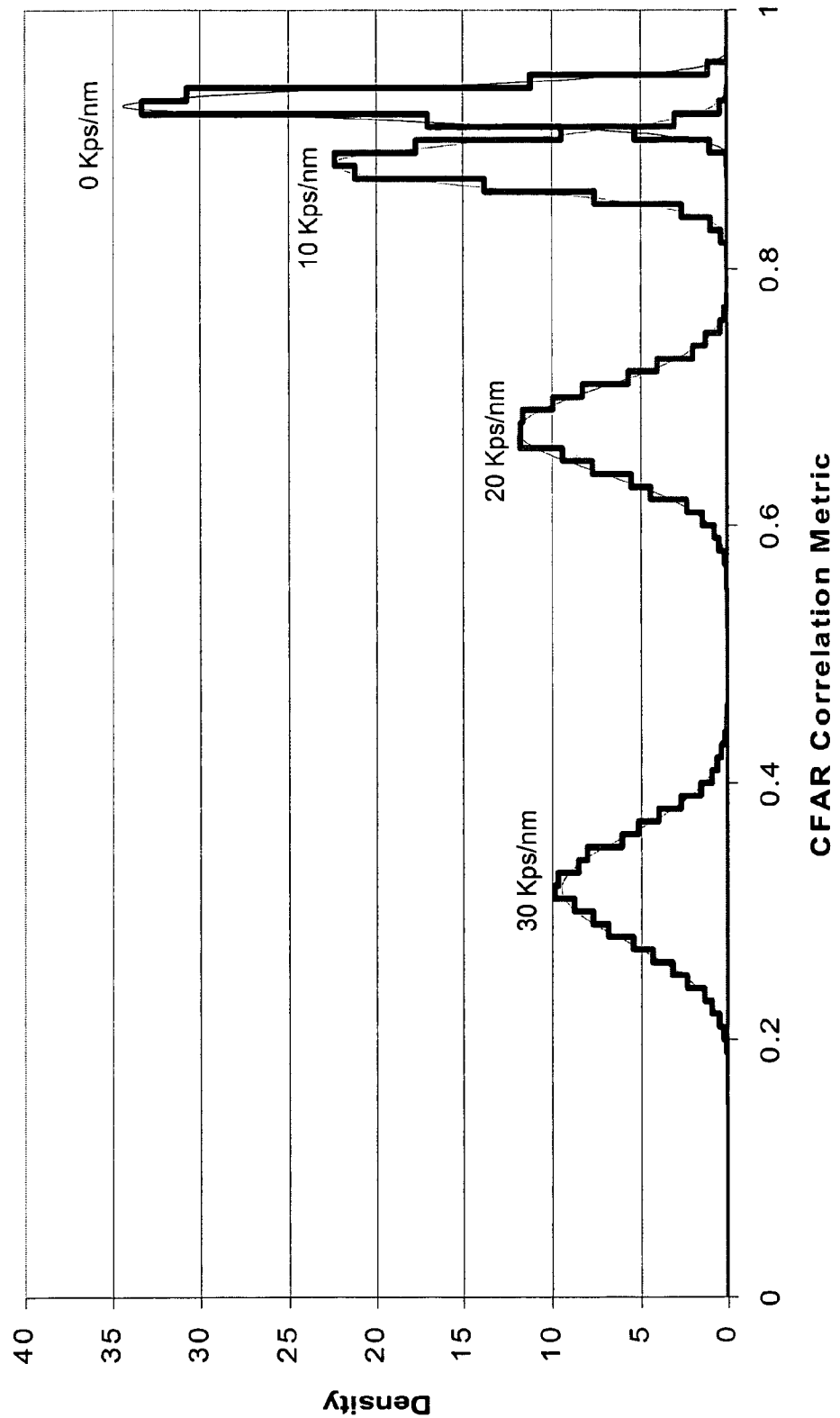
FIG. 4 shows a plot of the probability density function for the correlation metric as a function of the delta dispersion.

FIG. 4 shows one example of a plot of the probability density function for the correlation metric for different residual dispersion values. The "residual dispersion" is the difference between the actual system dispersion and the DC 46 dispersion setting. The correlation metric varies as a function of residual dispersion. Ideally, a given residual dispersion corresponds to a specific correlation metric value, but in the presence of noise the measured correlation metric will vary for a given residual dispersion. Examples of the resulting probability density functions are shown in FIG. 4 for residual dispersions of 0 kps/nm, 10 kps/nm, 20 kps/nm, and 30 kps/nm. In this case, the distributions are approximately Gaussian. For example, if a UW is transmitted in a system with 30 Kps/nm dispersion and the DC 46 is set to compensate for 10 Kps/nm of dispersion, the difference, or delta, is 20 Kps/nm. Therefore the peak output of the UW correlator 50 will likely fall within the range of 0.6 to 0.75. These probability density functions may be used to determine the DC 46 setting, as described below, in order to obtain the desired dispersion compensation.

The system 10 may have several modes of operation. For example, the system 10 may initially operate in an acquisition mode, where the system 10 estimates the dispersion in the system 10. Thereafter, the system 10 may operate in a track mode, where the system 10 tracks and updates the dispersion estimate for the system 10. Both of these modes may use the processing as described herein and may be controlled, for example, by the NMS 16 or through other control devices. Other modes and combinations of modes are also possible with the present invention.

During the acquisition mode, the system 10 operates in order to obtain an initial estimate of the dispersion, which can be used to select a DC setting. In one embodiment, the DC 44 is set to a dispersion measurement compensation setting, a UW is transmitted through the system 10, the correlator 50, integrator 52, and normalizer 54 process the UW signal, and the dispersion controller 56 receives the processed UW signal. Subsequent UWs may be transmitted through the system 10 with the DC 44 set to other dispersion measurement settings. This process can be repeated as often as desired with different dispersion measurement compensation settings, and the results used to estimate the dispersion in the system 10 and to select an initial DC 46 dispersion setting. Other modes or methods of determining the system 10 dispersion may also be used with the present invention.

Figure 5:
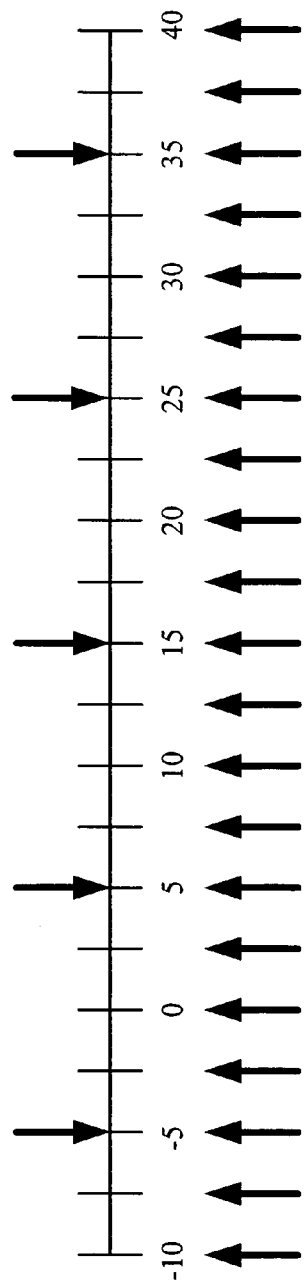
FIG. 5 shows an example of the dispersion measurement settings that may be used to estimate the dispersion in the system.

FIG. 5 shows a chart which illustrates residual dispersion and how it can be used with the dispersion measurement settings to estimate the dispersion in the system 10. The five downward-pointing arrows at dispersion values of −5, 5, 15, 25, and 35 Kps/nm show the use of five different dispersion measurement settings used by the DC 46 in acquisition mode. In this example, the system 10 sets the DC 46 dispersion compensation to one of the settings (e.g., one of −5 Kps/m, 5 Kps/m, 10 Kps/m, 15 Kps/m, 25 Kps/m, and 35 Kps/m), transmits a UW, and processes the received UW signal to determine the normalized correlation for the UW. The process is repeated for each of the DC 46 dispersion compensation settings. The system 10 may transmit and process UWs at more or less than five settings, at the same or different settings than those described herein, and more than one UW may be transmitted and processed for each dispersion measurement setting. The system 10 then calculates the system dispersion based on the results from the acquisition mode, as described in more detail hereinbelow, and selects the most appropriate DC 46 setting. In FIG. 5, the available DC 46 settings in one embodiment are shown as upward-pointing arrows below the line ranging from −10 to 40 Kps/nm in increments of 2.5 Kps/nm. The number and spacing of the dispersion measurement settings and the DC settings may vary from those illustrated herein.

Figure 6:
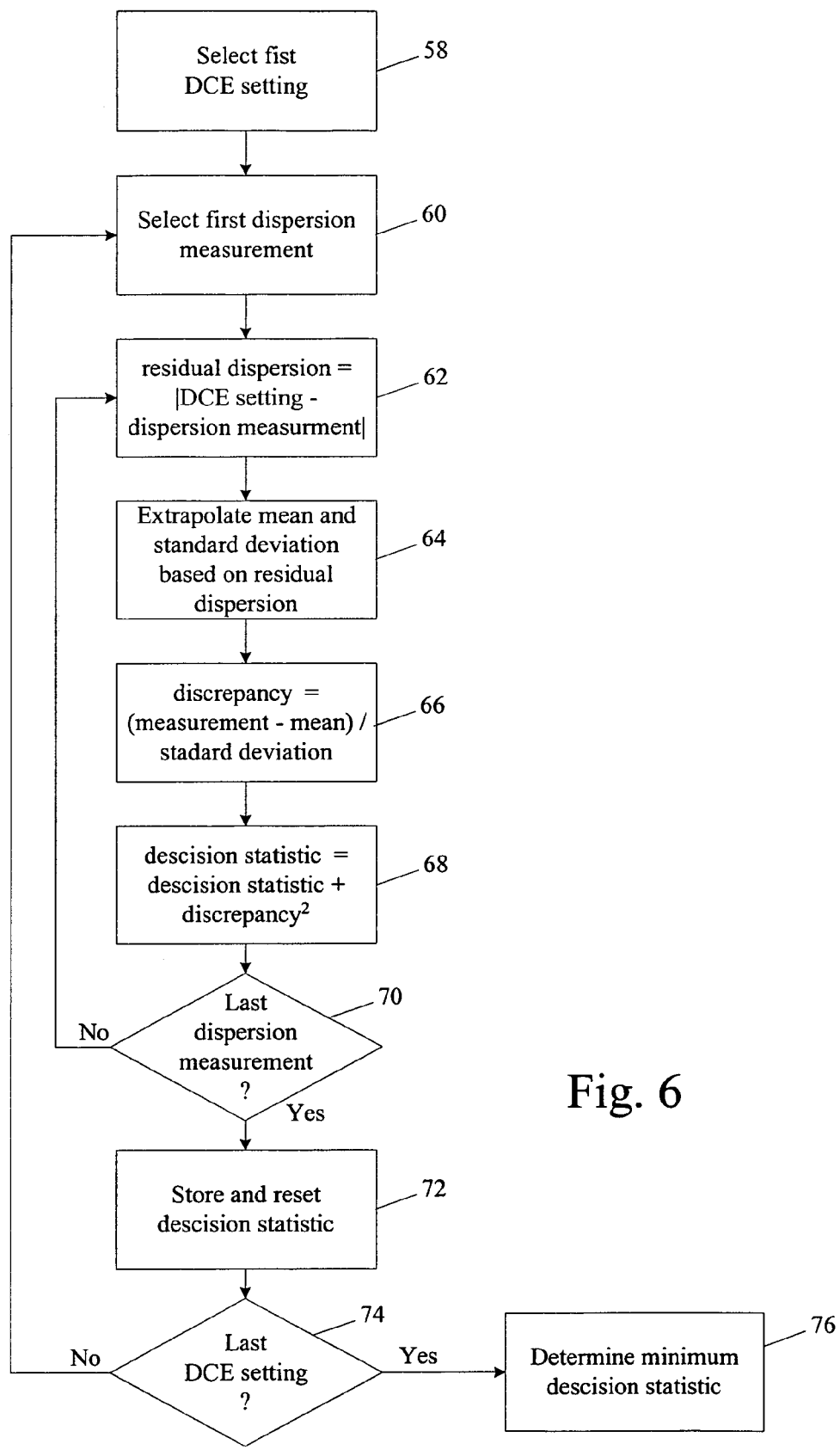
FIG. 6 is a flow diagram showing how the dispersion controller determines the DC setting to apply in the system.

FIG. 6 is a flow diagram showing one embodiment of how the dispersion controller 56 determines a maximal likelihood estimate of the dispersion and selects the DC 46 setting to compensate for this dispersion. The dispersion controller 56 assumes that each of the possible DC 46 settings is the correct setting and calculates a decision statistic that indicates the weighted distance from the correlation results for each dispersion measurement setting. The dispersion controller 56 selects the setting with the lowest decision statistic to compensate for dispersion in the system 10.

In step 58, the dispersion controller 56 selects the first test DC setting. In the example of FIG. 5, the first DC setting is −10 Kps/nm. In other embodiments, the DC settings may be used in descending numerical order, rather than ascending numerical order. Alternatively, the DC settings may be selected randomly or in a non-numerical order.

In step 60 the first dispersion measurement setting is selected. In the example of FIG. 5, the first dispersion measurement setting is −5 Kps/nm.

In step 62, the residual dispersion is calculated. The residual dispersion is the difference between the DC setting and dispersion measurement. The residual dispersion has an associated probability density function, like those shown in FIG. 4, with a mean and a standard deviation.

In step 64, the mean and standard deviation associated with the residual dispersion are determined from a look up table. Linear interpolation, or more sophisticated techniques, may be used to determine values between residual dispersion table entries.

In step 66 the mean and standard deviation are used to calculate the discrepancy by subtracting the mean from the measurement and dividing the difference by the standard deviation. The discrepancy is a measure of the normalized distance between the assumed and measured dispersion.

In step 68 the discrepancy is squared and then added to the previous value of the decision statistic. The decision statistic is a sum of the square of the discrepancies for each of the dispersion measurement settings. A smaller decision statistic indicates better dispersion compensation for the DC setting.

In step 70, the dispersion controller 56 selects the next dispersion measurement setting, for example 5 Kps/nm in FIG. 5, and loops back through steps 60-70. The processing is repeated for each of the dispersion measurement settings. When all of the dispersion measurement settings are processed, the loop proceeds to step 72.

In step 72, the decision statistic for the DC setting is stored 72, and the decision statistic value is reset to zero.

In step 74, the dispersion controller 56 selects the next DC setting, which is −7.5 Kps/nm in the example of FIG. 5 and loops back to select the first dispersion measurement setting in step 60 and the processing is repeated for the new dispersion measurement. This processing continues until a decision statistic has been determined for each of the possible DC settings. Finally, the dispersion controller 56 determines DC setting resulting in the minimum value of the decision statistic 76. This is the DC setting that will be used to compensate for dispersion in the system.

Another method of estimating the dispersion compensation would be to select the DC measurement setting that has the largest correlation metric. In this embodiment, it is preferable to increase the number of UWs transmitted and their corresponding DC measurement settings. Additionally, the DC measurement setting with the largest correlation measurement metric and adjacent DC measurement setting(s) may be selected and an interpolation performed to estimate the dispersion.

Another method of estimating the dispersion compensation would be to perform a coarse estimate of the dispersion by selecting the DC measurement setting with the maximum correlation metric or interpolating about this DC measurement setting. This estimate may be used to select a limited number of DC settings near the estimate that are tested using the maximal likelihood method described above.

After the system 10 initially estimates the dispersion, the system 10 may enter the track mode. During track mode, the system 10 transmits UWs along with payload data. The UWs may be transmitted at regular or irregular intervals, such as with every frame of data, every nth frame, or at some other rate. When the UWs are transmitted, the DC 46 measurement settings can be varied as previously described in relation to FIG. 5. When all of the data for the various DC 46 measurement settings has been gathered, updated DC settings are determined and applied. Alternatively, small DC 46 setting adjustments may be made after each UW is received. Typically, system 10 dispersion changes will not be large or abrupt, and minor tuning of the previous setting, as determined from one or a small number of measurements, is all that is needed. Furthermore, a wide range of DC 46 settings is often undesirable in a system 10 carrying live traffic, because a large DC setting change may cause errors in the received data. The rate at which the UWs are transmitted determines the overall time it takes to periodically update the dispersion estimate and DC settings.

Another approach that may be used in the track mode is to transmit UWs at some rate and to process the UWs as described above using the current DC settings resulting in a decision statistic. The decision statistic is compared to a threshold, and if the decision statistic exceeds the threshold, then the system 10 may attempt to reacquire a DC setting. The threshold may be a fixed value or based upon the decision statistic obtained for the DC setting during the acquisition mode. For example, the threshold may equal 1.1 *decision statistic.

One method of reacquiring the DC setting, would be to repeat the acquisition mode process as described in relation to FIG. 5. Another method for reacquiring the DC setting would set the DC setting to the adjacent DC settings. In one embodiment, if the either of decision statistics is less then a threshold, then the DC setting with the lowest decision statistic is chosen. If neither adjacent DC setting is below the threshold then the next adjacent DC settings, i.e., two DC settings away, are selected and the process repeated. This continues until a DC setting is below the threshold, until all of the DC settings have been attempted, or until a certain number of settings has been attempted. If all of the DC settings have been attempted, then the setting with the lowest decision statistic desc_stat may be selected. If after a certain number of attempts no estimate is obtained, the system 10 may then attempt to reacquire the dispersion estimate as described in relation to FIG. 5 above.

Another method of reacquiring the DC setting would have the system select several (e.g., two or three) of the nearest DC measurement settings and transmit UWs for each setting. The resulting measurements may then be used to determine the DC setting as described above in relation to FIG. 5. Another variation for reacquiring the correct DC setting would have the system periodically reacquire the dispersion estimate even if the dispersion does not appear to have drifted.

Figure 7:
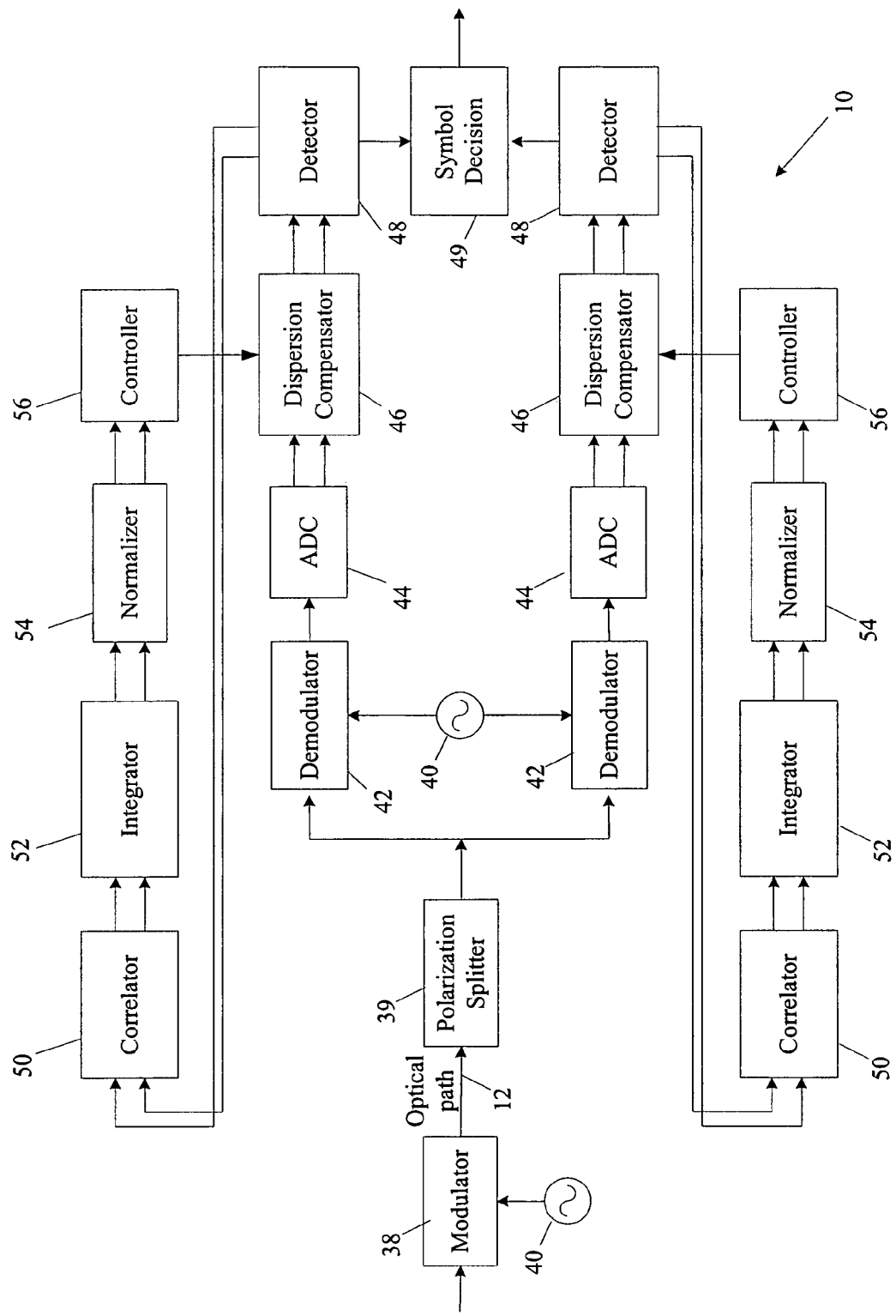
FIGS. 7 and 8 show other embodiments of the present invention that compensates for polarization mode dispersion.

FIG. 7 shows another embodiment of the present invention that compensates for polarization mode dispersion (PMD). The system 10 in FIG. 7 separates the optical signal into orthogonal polarization signals that are then processed for dispersion as described above. Once each polarization signal is dispersion compensated, they are recombined into a single signal.

A modulator 38 receives input data that includes a UW as an electrical signal. The modulator 38 modulates that input data onto an optical carrier provided by the optical source 40. The optical path 12 connected to the modulator receives and carries the optical signal from the modulator 38 to the polarization splitter 39. In the embodiment illustrated in FIG. 7, the polarization splitter 39 separates the optical signal into two orthogonal polarization modes. Each demodulator 42 produces an electrical signal corresponding to the two polarization modes of the optical signal. The signal for each polarization mode may then be processed as described before by an ADC 44, DC 46, detector 48, UW correlator 50, integrator 52, normalizer 54, and dispersion controller 56. Each of the signals may have a different amount of dispersion due to PMD, and because the signals are processed separately, the polarization-dependent effects of dispersion can be separately compensated. At the same time, the effects of chromatic dispersion are compensated as well. The outputs of the detectors 48 for each polarization mode are combined and a symbol decision 49 is made. Symbol decision 49 may involve adding the two detected signals together and determining the digital symbol associated with the signal. If one of the signals is much stronger than the other, then only the stronger signal may be used. Also, if the signal processing determines that there is an error in the signal data, the data for that polarization may be ignored during symbol decision 49.

Figure 8:
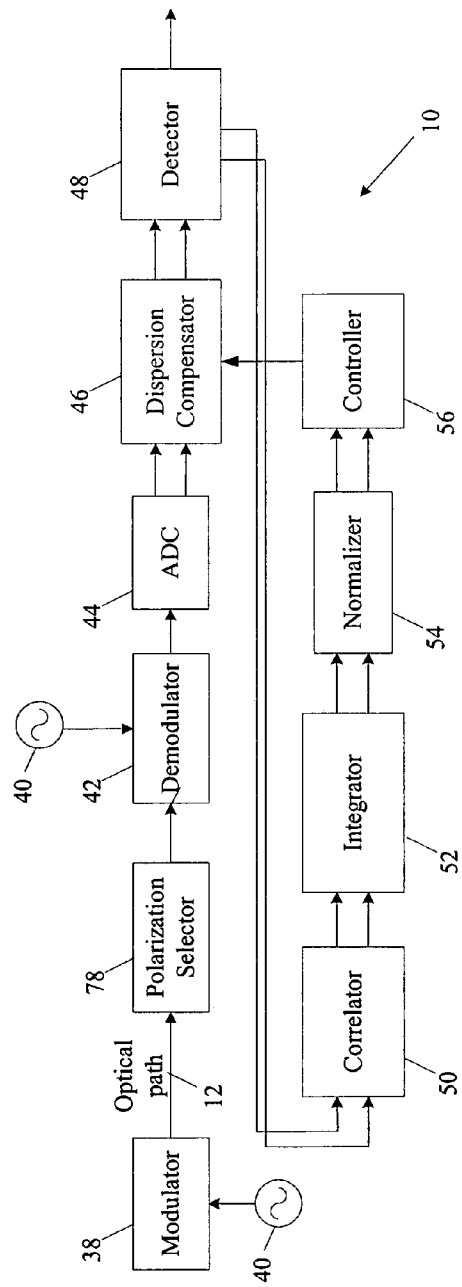

FIG. 8 shows another embodiment of the present invention that compensates for polarization mode dispersion (PMD). This embodiment is similar to the embodiment found in FIG. 7, but instead only processes a single polarization mode signal as described herein. A polarization selector 78 selects the stronger polarization mode in the optical signal and only processes that polarization mode. This reduces the amount of hardware required to compensate for PMD.

Figure 9A:
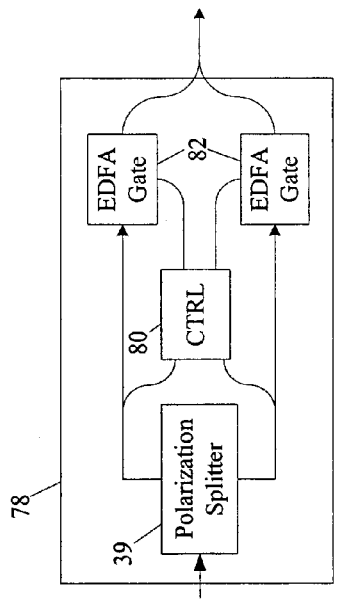
FIGS. 9A-C show embodiments of polarization selectors.
Figure 9C:
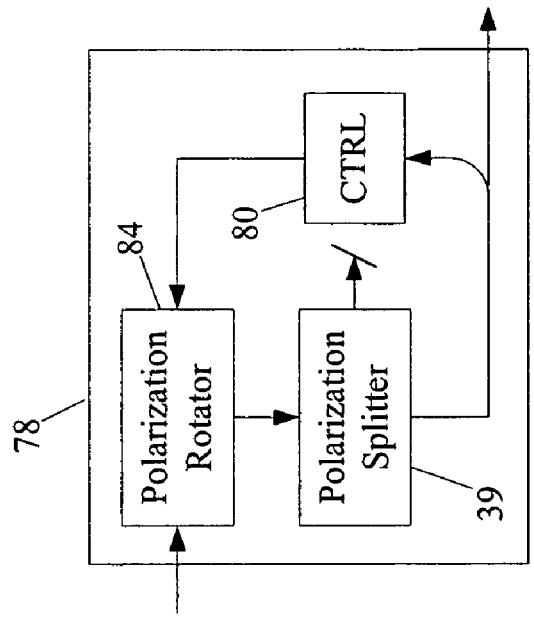
Figure 9B:
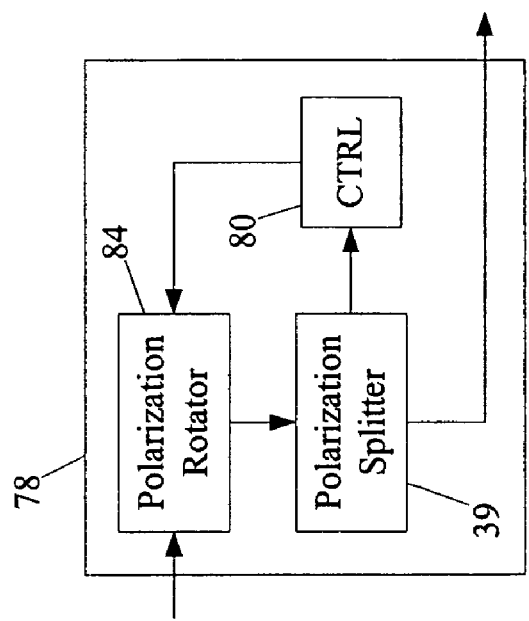

FIGS. 9A-C show embodiments of a polarization selector 78. In FIG. 9A, a polarization splitter 39 receives the optical signal and separates the optical signal into two orthogonal polarization signals. A controller 80 receives a portion of each of the two orthogonal polarization signals and determines which signal is stronger. The controller 80 connects to two EDFA gates 82. The two EDFA gates 82 each receive one of the orthogonal polarization optical signals. The controller 80 turns the EDFA gates 82 on or off to allow only the stronger orthogonal polarization signal to pass through the EDFA gates 82. The outputs of the EDFA gates are combined into a single output from the polarization selector 78. It is also possible that both EDFA gates 82 may be turned on in certain situations to allow both signals to pass and to be recombined. FIG. 9B shows another polarization selector 78 that has a polarization rotator 78, polarization splitter 39, and controller 80. The polarization rotator 84 receives an optical signal and may be controlled to vary the polarization rotation applied to the optical signal. The polarization splitter 39 receives the output of the polarization rotator 84 and separates the optical signal into two orthogonal polarization signals. One of the polarization signals is the output of the polarization selector 78. The other polarization signal is fed into the controller 80. The controller 80 controls the polarization rotator 84 so that the other polarization signal is minimized. This results in the polarization separator 78 rotating the polarization of the input optical signal so that the largest possible polarization signal is output. FIG. 9C is similar to the embodiment in FIG. 9B, but instead the controller is coupled to the same polarization splitter output that is the output of the polarization separator 78. In this embodiment the controller 80 controls the polarization rotator 84 so that the output polarization signal is maximized.

In another embodiment of the present invention, input data is modulated onto one or more subcarriers of the optical carrier. For example, two or more data streams may be modulated onto subcarriers above, below, or both above and below the optical carrier. When subcarrier modulation is used, each data stream may have its own UW that will be modulated onto a subcarrier. When the optical signal is demodulated, the data stream from each subcarrier is separately processed as previously described in relation to FIGS. 5 and 7. Alternatively, less than all of the subcarriers may carry UWs, and the relative closeness of the subcarrier frequencies may allow for all of the subcarriers to be dispersion compensated with data from less than all of the subcarriers. Subcarrier modulation may be used to transmit data at a higher rate using a single optical source. For example, a 40 Gb/s data signal may quickly degrade due to dispersion. If instead the 40 Gb/s data signal is split into eight 5 Gb/s signals that are modulated onto subcarriers, each of the 5 Gb/s signals may experience a smaller dispersion that may be estimated and compensated as described above.

Figure 10:
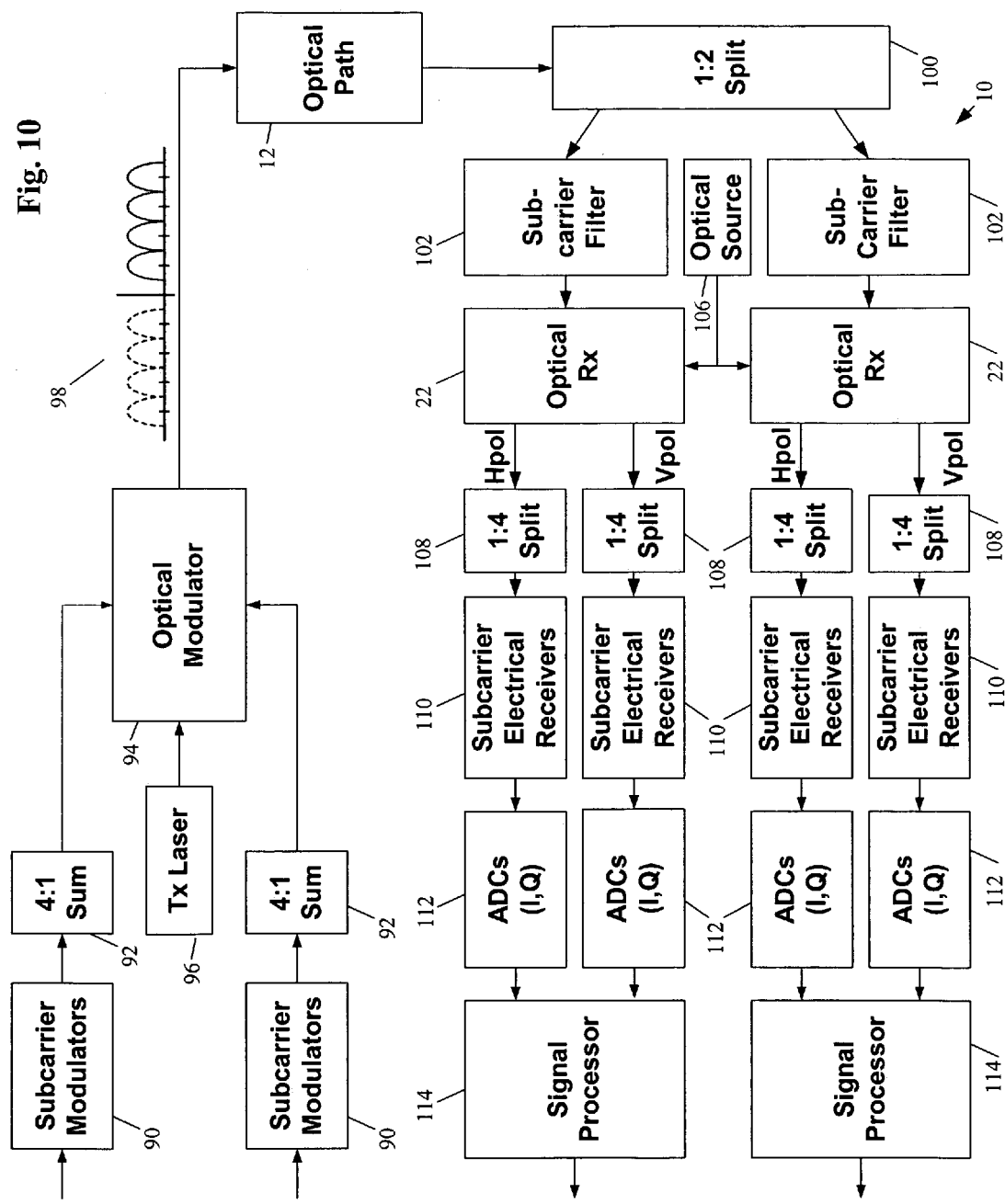
FIG. 10 shows an optical communication system according to the present invention.

FIG. 10 shows an optical communication system 10 according to one embodiment of the present invention. The system has subcarrier modulators 90 that receive input data and modulate the data onto an electrical signal. A combiner 92 combines the modulated signals into a single electrical signal. An optical modulator 94 modulates the electrical signal onto an optical signal. An optical path 12 carries the optical signal to an optical receiver 104. One or more amplifiers may be placed along the optical path to amplify the optical signal. The optical receiver 104 receives the optical signal and produces a received electrical signal. Subcarrier electrical receivers 110 demodulate the received electrical signals. The demodulated signals are converted into digital signals. A signal processor 114 then processes the digital signals and outputs the source data signals.

The optical communication system 10 will be described in terms of a system that transmits 40 Gb/s signal per optical source 96. The system 10 modulates the 40 Gb/s input data as eight 5 Gb/s streams onto eight subcarriers that are transmitted on an optical carrier. This system configuration provides an example of the present invention but other variations are possible. For example, the number of subcarriers may be more or less than eight, the number and types of elements in the system may vary, the data rate of each subcarrier may vary, the data rate produced by each optical source 96 may vary, etc.

The modulators 90 modulate input data from data sources onto a subcarrier frequency. In this example, there are eight modulators: four upper band modulators 90 and four lower band modulators 90. Each modulator receives 5 Gb/s input data. The input data may contain any sort of data. The input data may be independent from one another, e.g. aggregated data, or may be larger data streams, i.e. greater than 5 Gb/s, that may be split up among the data source streams. Also, the input data may be forward error correction encoded ("FEC") or otherwise encoded (e.g., SONET), at the data sources 104 or at some other part of the system 10, or no encoding may be used. The modulators 90 are differential phase modulators that modulate the input data into a differentially phase modulated electrical signals. Differential phase modulation allows for frequency estimation of the optical carrier frequency that will be described below. For example, differential quadrature phase shift keying ("DQPSK") modulation may be used where two input bits correspond to one of four phase states. Other forms of differential phase modulation may be used as well. If frequency estimation is not required, then other types of modulation may be used as well.

The modulators 90 modulate the modulated signal from a base band frequency to a subcarrier frequency. In this example, there are eight subcarrier modulators 90: four upper band and four lower band subcarrier modulators 90. The subcarrier frequencies may be selected to minimize interference between the different modulated signals and also to maximize the use of the available bandwidth. The subcarrier modulators 90 may use a mixer, Manchester encoding, or other methods to modulate the data onto the subcarriers. A combiner 106 sums the four upper band subcarrier modulator outputs thereby producing an electrical signal carrying all four upper band modulated input data streams. A second combiner 106 does the same for the four lower band subcarrier modulator outputs.

The optical modulator 94 receives the lower and upper band signals and a transmit optical source 96. The transmit optical source 96 produces the optical carrier that is modulated with the upper and lower band signals. The optical modulator 96 coherently modulates the upper and lower subcarrier signals onto either the upper or lower subcarriers of the optical carrier. Coherent modulation preserves the phase of the modulation signal allowing for coherent signal processing to estimate the optical source frequency, system dispersion, and timing offsets. Coherent processing improves the signal to noise ratio, which results in improved transmission performance. The optical signal 98 includes eight subcarriers each carrying a 5 Gb/s signal resulting in a total of 40 Gb/s being carried by the optical carrier.

The optical path 12 carries the optical signal from the optical modulator 94 to the coherent optical receiver 22. The optical path 12 will typically include optical fiber, but may also include other optical medium including free space transmission. Optical amplifiers, switches or other devices may be situated along the optical path as discussed hereinabove.

A 1:2 splitter connected to the optical path 12 splits the optical signal onto two outputs. Subcarrier filters 102 are connected to the outputs of the splitter 100. The filters 102 pass either the upper or lower subcarriers and block the other producing an optical signal containing only the upper or lower subcarriers.

The optical receivers 22 each receive one of the subcarrier signals and coherently demodulate the subcarrier signal using an optical signal from a receive optical source 106. The receiver optical source 106 is controlled to match the frequency of transmitter laser source 106. The receiver optical source 106 may include an automatic frequency control ("AFC") that provides frequency control of the receiver optical source 106. The AFC may be integrated in to the receiver laser source 106 or may be separate. The optical receivers 22 produce two orthogonal demodulation polarization component signals. Therefore, the receiver outputs four electrical signals: upper subcarriers x polarization, upper subcarriers y polarization, lower subcarriers x polarization, and lower subcarriers y polarization.

Subcarrier electrical receivers 110 demodulate the electrical side band signals into specific subcarrier signals. First, four 1:4 splitters 108 split each of the four side band signals from the receiver into four signals resulting in total of sixteen signals. Sixteen subcarrier electrical receivers 110 demodulate the sixteen split signals from a subcarrier frequency to baseband. The sixteen subcarrier demodulated signals correspond to two polarizations for each of eight subcarrier signals. Each of the electrical receivers 110 may include a matched filter or other filters to filter out noise and other unwanted signals. Sixteen ADCs 112 convert the sixteen subcarrier demodulated signals into in-phase and quadrature (I and Q) digital signals. The outputs of the ADC's 112 result in thirty-two digital signals corresponding the eight subcarriers with two polarizations with I and Q components. The signal processors 114 then process these signals.

Figure 11:
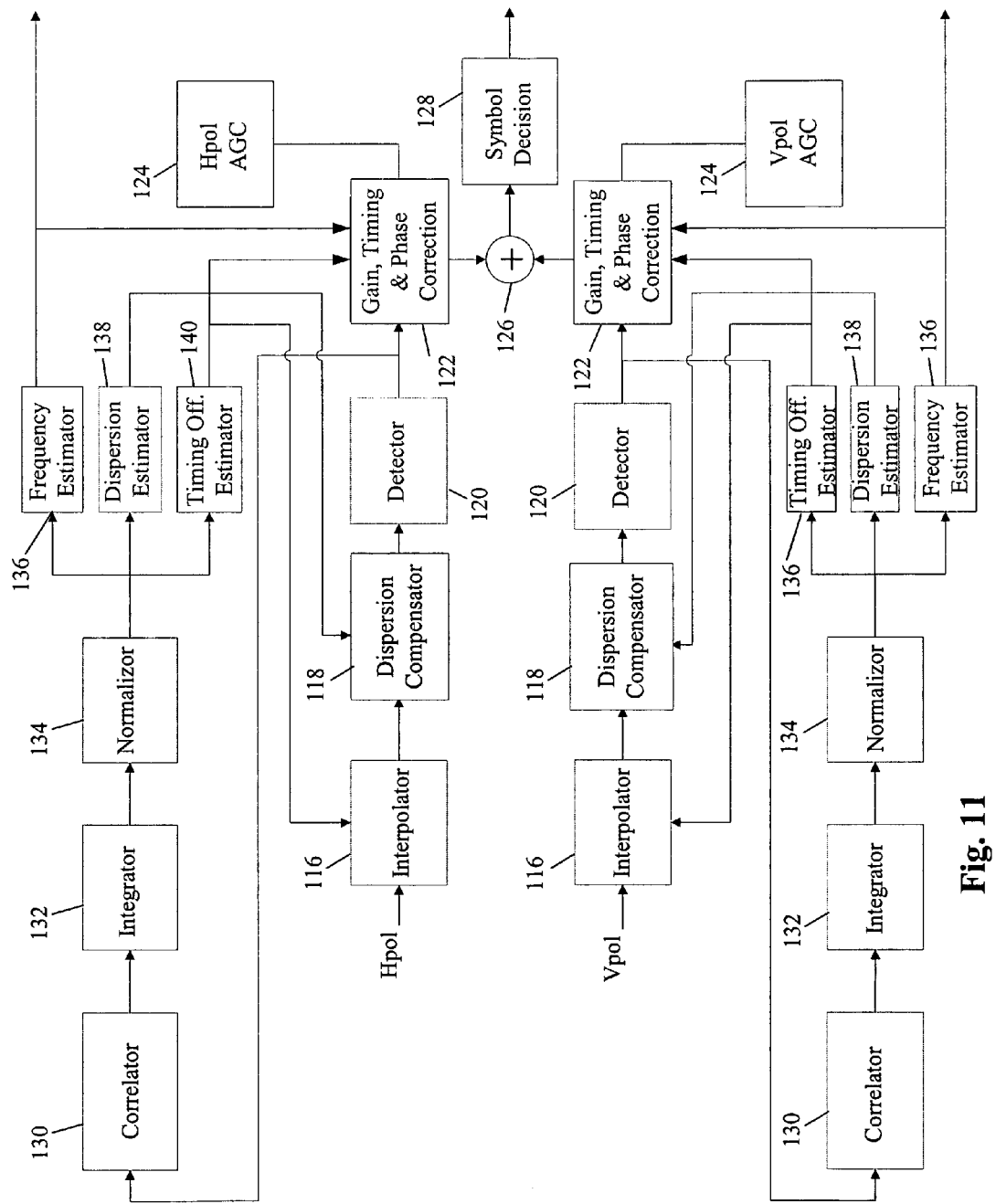
FIG. 11 shows a flow diagram of the signal processing carried out in the signal processor.

FIG. 11 is a flow diagram illustrating one embodiment of signal processing in the signal processor 114. The signal processor 114 may include an interpolator 116 that interpolates the digital samples of the signal. A dispersion compensator 118 dispersion compensates the signal. The detector 120 detects the signal. The detector output may be gain, timing, and phase corrected 122,124. The corrected signals for the two polarizations are combined 126, and a symbol decision is made 128. Also, the output of the detector 120 is processed by a correlator 130, an integrator 132, a normalizer 134, and then by frequency, dispersion, and timing offset estimators 136, 138, 140.

The signal processor 114 may be implemented, for example, in an application specific integrated circuit ("ASIC"), in a general purpose processor, or in a general signal processor. Also, a single signal processor may be used to process all of the signals, or multiple signal processors may be used to process any number of the signals. The signal processor 114 may process the horizontal and vertical polarization signals separately and then combines them for a final symbol decision 128. The polarizations may be processed separately to compensate for the effects of polarization mode dispersion ("PMD") and other effects on the signal that may vary with polarization. The ADC 112 produces I and Q digital signal in order to preserve signal phase information during the signal processing.

The interpolator 116 interpolates the I and Q samples producing samples at a higher rate. Ideally, the sampling rate is at least twice the symbol rate of the data signal. The ADC 112 may use the ideal sampling rate or oversample or undersample the analog signal. Typically, if the signal is undersampled, some of the data may be lost. The undersampled signals may be reconstructed by interpolating the samples according to the present invention. Interpolating the undersampled I and Q signals according the present invention results in data samples at a rate greater than the capability of available ADCs. For example, for a 5 Gb/s data stream that is QDPSK modulated, the ideal sampling rate including an over head of 20% is 6 Gsamp/s because the symbol rate is 3 Gsymb/s and the ideal sampling is two times the symbol rate according to the Nyquist criteria. If the ADC 112 is only capable of 4 Gsamp/s, then a 3/2 interpolation is required to achieve the desired sampling rate. The interpolation may be a simple linear interpolation using adjacent points or it could involve higher order techniques using more points. The interpolation may also take into account the type of modulation used that may provide a priori knowledge of the expected signal characteristics.

The dispersion compensator ("DC") 118 compensates for dispersion in the system 10 based upon an estimate of the dispersion. The DC 118 may be implemented as a finite impulse response (FIR) filter. The compensation may be either linear or nonlinear. The DC 118 has a number of possible DC settings that correspond to different levels of equalization compensation. In the case of the FIR filter implementation, each DC setting corresponds to a set of FIR filter coefficients. The DC 118 selects a DC setting corresponding to the dispersion estimate.

The detector 120 detects the dispersion compensated signal. In the case of DQPSK modulation, the detector 120 determines the phase state of successive symbols in the signal and determines the phase difference between them. The phase difference corresponds to the two bits of data transmitted. Depending on the specific modulation used, fewer or more bits may be coded in each symbol, and the detector 120 may need to account for phase offsets. The detector 120 removes constant phase shifts between symbols, therefore receive optical source 106 phase noise is mitigated because it varies slowly compared to the symbol rate of the data signal. When DQPSK modulation is used, the detector 120 also converts frequency offsets between the transmit and receive optical sources 96, 106 into phase rotation that may be used to estimate the frequency offset.

The detected signal is then gain, timing, and phase corrected 122. The timing and phase corrections are made based upon timing offset and frequency offset estimates. These corrections are made to align the processed signals for the two polarizations. Once the signals are corrected, the vertical and horizontal polarization signals are combined 126. A symbol decision is made based upon the combined signal.

A correlator 130 also receives the output of the detector 130 and performs a sliding window correlation. With each frame of data, a unique word (UW) may be transmitted that is processed in order to estimate the receive laser source frequency offset, system dispersion, and system timing offset. The UW is a set pattern of bits that may be processed to estimate certain system parameters. A single UW may be used for frequency, timing offset, and dispersion estimation, but using two UWs, one for frequency offset and timing offset estimation and the other for dispersion estimation, generally results in better estimation performance. Each of the two UWs may then be tailored for the specific estimation application. The correlator 130 receives a frame of data and correlates it with the ideal response for the UW. The location of the peak of the correlator output indicates the level of correlation and an estimate of the parameter to be estimated.

An integrator 132 may be used to integrate the output of the correlator 130 for multiple frames. Integration of the correlator output improves the signal to noise and thereby improves the overall parameter estimate. The integration may be either coherent or non-coherent.

The normalizer 134 receives and normalizes the output of the integrator 132. In one embodiment, the normalizer 134 determines the total energy in the received signal and normalizes the integrator 132 output based upon the total energy. Normalization allows for a single constant false alarm rate decision threshold to be used. In another embodiment of a normalizer 134, automatic gain control (AGC) is used to normalize the integrator 132 output. The AGC maintains a constant gain value for the integrator 132 output. The AGC gain value is based upon the level of the total energy received. In another embodiment of a normalizer 134, constant false alarm rate (CFAR) processing is performed, such as by calculating the energy in the integrated signal, and then dividing each data point in the integrated signal by the calculated energy value. The normalized correlation values are referred to as normalized metrics. The normalized metrics are computed sample-by-sample in a processing window that covers the frame timing uncertainty. The peak normalized metric and its sample position are used for estimation processing.

The frequency estimator 136 processes the UW to determine the frequency offset between the transmit and receive optical sources 96, 106. If the frequency of the receive optical source 106 is not at the desired value, the frequency offset will manifest itself as a linear change in phase over time. Therefore, the frequency offset may be determined by taking the arctangent of the peak I and Q samples from the CFAR processor. With multiple subcarriers the actual frequency offset may be ambiguous because large frequency offsets can cause one subcarrier to be detected in the filter for another subcarrier. In that case, the frequency of the receiver optical source 106 may be scanned and UWs transmitted at different frequencies until the correct receive optical source frequency can be determined. This technique is described in further detail in commonly owned copending U.S. Provisional Patent Application 60/694,335 filed on Jun. 27, 2005, which is incorporated herein by reference. Other methods of frequency estimation may be used as well. For example, UWs may be transmitted and then processed using correlators tuned to different frequencies. The correlator with the strongest response identifies the frequency of the optical source. The estimated frequency then may be used for phase correction and also is used to adjust the frequency of the receive optical source 106.

The timing offset estimator 140 uses and processes the same UW as the frequency estimator 136. The peak normalized metric and its position within the correlation window are used for coarse frame timing estimation. Lagrange interpolation using the normalized metrics at the observed peak and its nearest neighbors provide fine symbol and frame timing estimates. The timing offset correction 122 uses the timing offset estimate to time align the two polarization signals allowing the combination of the two polarization signals for symbol decision.

The dispersion estimator 138 estimates the dispersion in the system 10 and controls the DC 118 to compensate for dispersion in the system 10. The dispersion estimator 138 estimates the dispersion by having the system transmit a number of UWs. The dispersion estimator 138 selects a different dispersion measurement setting for each UW. The dispersion measurement settings set the dispersion compensation of the DC 118. The processed results for each UW with the different dispersion measurement settings are then used to estimate the dispersion and to determine which DC setting to use. Further description of dispersion compensation may be found in commonly owned copending. U.S. Provisional Patent Application 60/694,321 filed Jun. 27, 2005, which is incorporated herein by reference.

Figure 12:
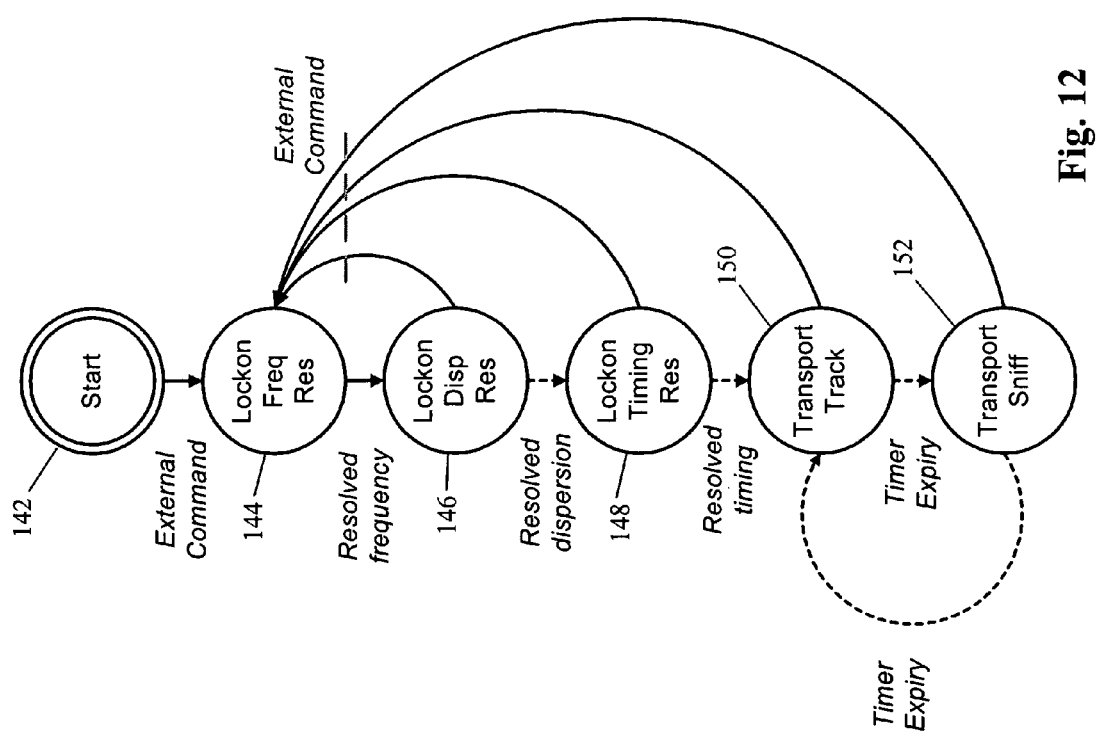
FIG. 12 shows a transition diagram for the optical communication system according to the present invention.

FIG. 12 shows a transition diagram for the system 10 according to the present invention. In operation, the system 10 may have two modes: lockon and transport. During lockon the system 10 may have three submodes: frequency resolution, dispersion resolution, and timing resolution. During the transport mode the system 10 may have two submodes: track and sniff. The system 10 enters the lockon mode typically at system startup as commanded by the NMS 16. The lockon mode is a relatively slow process requiring a large number of data frames due primarily to the fact that the frequency of a typical optical source 106 is controlled using temperature. Once all of the subcarriers can be successfully demodulated, the lockon mode transitions to the track mode.

The system 10 starts 142 by receiving a command from the NMS 16 and enters the frequency resolution submode 144. In the frequency resolution submode the system 10 transmits and processes UWs. The frequency of the receive optical source 106 is scanned until all of the subcarriers can be demodulated. Because at this point the dispersion of the system is unknown, at each frequency, multiple UWs are transmitted and different dispersion measurement settings used for each UW. At least one or two of the dispersion settings should provide enough dispersion compensation for the frequency resolution submode 144 to estimate the receive optical source frequency offset. Once the frequency resolution submode 144 determines the correct receive optical source frequency the dispersion resolution submode 146 is entered.

In the dispersion resolution submode 146 the system 10 transmits and processes a number of UWs to estimate the dispersion in the system 10. UWs are transmitted and the DC 118 is set to different dispersion measurement settings and the UWs are processed. After all the UWs are processed for each dispersion measurement setting, the dispersion estimator determines the DC setting. If this process fails, the system 10 returns to the frequency resolution submode 144, otherwise the system 10 continues on to the timing resolution submode 148.

In the timing resolution submode 148 the system 10 transmits and processes a number of UWs to estimate the timing offset in the system. The peak normalized metric and its sample position within the correlation window are used for coarse frame timing, estimation. Lagrange interpolation using the normalized metrics at the observed peak and its nearest neighbors provide fine symbol and frame timing estimates. If this process fails, the system 10 returns to the frequency resolution submode 144, otherwise the system continues on to the transport mode.

In the track submode 150 of the transport mode, the system 10 transmits payload data and a frequency/timing UW with each frame. The UWs are processed as described above for frequency and timing offset estimates. These estimates are used to update the AFC and timing correction. The track submode will continue for a specified number of frames and then transition to the sniff submode 152, but more than one frame may bet transmitted with each submode.

In the sniff submode 152 the system 10 transmits a dispersion compensation UW with a frame. The system 10 enters the sniff mode 152 after every N data frames in the track submode 150. A different dispersion measurement setting is selected for each UW transmitted until all of the dispersion measurement settings have been used. At that time, an estimate of the dispersion is made to determine a new DC setting as described above. Typically one frame will be transmitted during the sniff mode 152 and then control is returned to the track submode 150, but more than one frame may be transmitted with each submode.

The optical communication system 10 may detect various errors in the transmission of data. When these errors occur they may be due to frequency, timing, or dispersion changes in the system 10. The system 10 may enter the lockon mode in order to reacquire estimates for these parameters. Also, if a given error likely results from one of the parameter estimates being bad, the system may just enter the submode associated with the parameter to be correctly reestimated.

Figure 13:
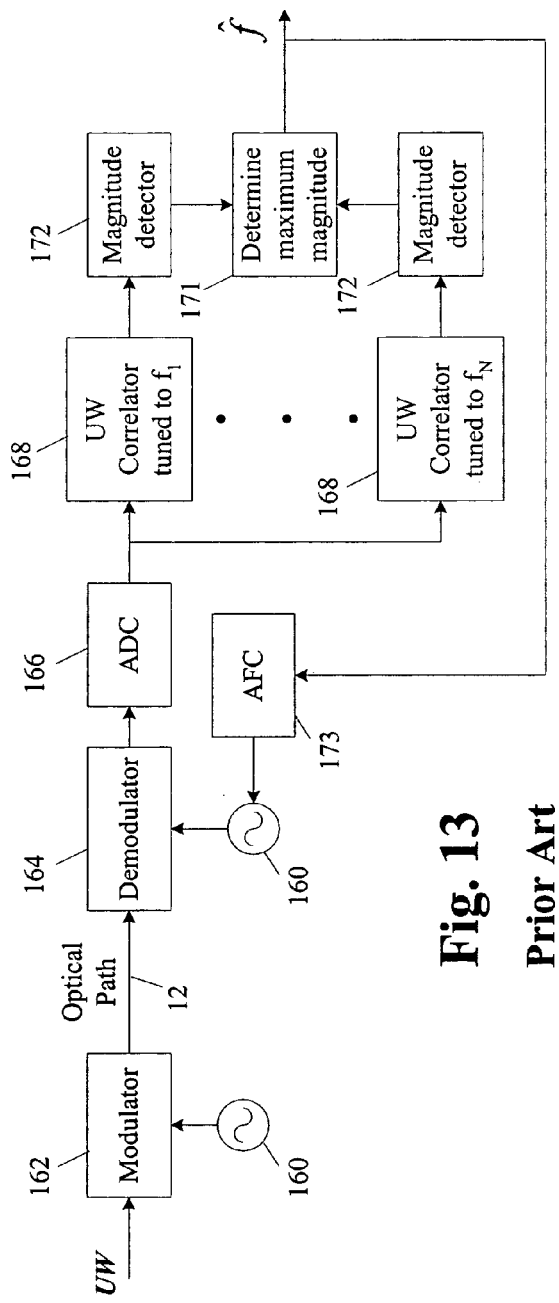
FIG. 13 shows a prior art system for determining the frequency of a receive optical source in an optical communication system.

FIG. 13 shows a prior art system for determining the frequency of a receive optical source 160 in an optical communication system. The prior art system may include a transmit optical source 160, modulator 162, optical path 12, demodulator 164, analog-to-digital converter ("ADC") 166, unique word ("UW") correlators 168, and magnitude detectors 172, and automatic frequency controller ("AFC") 173.

The system 10 receives an electrical signal carrying input data that includes a UW. The UW is a known pattern of data bits that are selected to provide the best frequency measurement. The modulator 162 modulates the electrical signal including the UW onto an optical carrier that is produced by the transmit optical source 160. The modulator 162 transmits the modulated optical signal along an optical path 12. A demodulator 164 receives and demodulates the modulated optical signal from the optical path 12 producing an electrical signal using a receive optical source 160. Any difference in frequency between the transmit and receive optical sources 160 will cause the demodulated signal to have a frequency offset. The analog-to-digital converter 166 converts the electrical signal to a digital signal. The digital signal is fed into a correlator 168 tuned to a specific frequency. The UW correlator 168 has a magnitude detector 170. This process is repeated for each frequency and its associated correlator. The UW correlator 168 with the maximum detected signal strength 171 indicates the actual frequency offset between the transmit and receive optical sources 160. This frequency is then fed to the AFC 173 that adjusts the frequency of the receive optical source 160.

In order to produce a clear indication of the optical source frequency, many UW's must be transmitted. With an uncertainty of approximately 5 GHz as found in many optical sources today, it may take 1000 UW's to obtain an estimate of the optical source frequency to within 5 MHz. This may result in an unacceptable amount of time to determine the optical source's frequency and is susceptible to phase noise.

Figure 14:
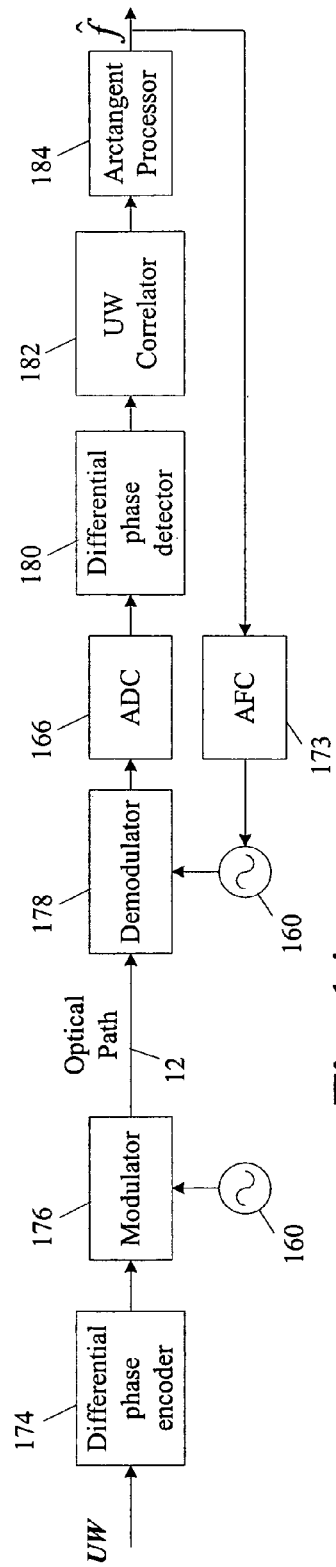
FIG. 14 shows an embodiment of a communication system according the present invention.

FIG. 14 shows an embodiment of a communication system according the present invention. The system includes a differential phase encoder 174, a coherent modulator 176, a transmit optical source 160, an optical path 12, a coherent demodulator 178, an AFC 173, a receive optical source 160, ADC 166, a differential phase detector 180, a UW correlator 182, and arctangent processor 184. The system performs a coarse frequency estimate by scanning the receive optical source 160 and then does a fine frequency estimate as described below.

The system 10 receives an electrical signal carrying input data including a UW that the differential phase encoder 174 encodes. A coherent modulator 176 modulates the differential phase encoded data onto an optical carrier from the transmit optical source 160. The modulator 176 may be part of a transmitter 20 that may also include filters, combiners 34, distributors 36, and other components. The coherent modulator 176 transmits the modulated optical signal along an optical path 12. A coherent demodulator 178 receives and demodulates the modulated optical signal from the optical path 12 producing an electrical signal. The coherent demodulator 178 uses an optical signal from a receive optical source 160 to demodulate the modulated signal. The ADC 166 converts the electrical signal into in phase and quadrature digital signals. The demodulator 178, receive optical source 160, and/or ADC 166 may be part of a receiver 22 that may also include filters, combiners 34, distributors 36, and other components. A differential phase detector 180 detects the electrical signals. The UW correlator 182 correlates the detected signals. The arctangent processor 184 determines a fine frequency offset from the peak I and Q values from the UW correlator. This fine frequency offset is then sent to the AFC 173 to tune the receive optical source 160 to the correct frequency.

The use of differential phase encoding and coherent processing of the data allows the frequency of the optical source to be determined in a single frame. With the use differential phase encoding, a frequency offset between the transmit and receive optical sources 160 results in a phase shift between symbols. Therefore, the fine frequency offset can be calculated as follows:

$$\hat{f} = \frac{R_s}{2\pi} a\tan2(\text{UW\_peak\_Q}, \text{UW\_peak\_I})$$

where $R_s$ is the symbol rate and UW_peak_Q and UW_peak_I are the quadrature and in phase values for the peak correlator output.

In FIG. 14, multiple UW's may be sent along the optical path 12 by modulating the UW data onto subcarriers of the optical carrier. For example, UW's may be modulated onto 2, 4, 6, etc. subcarriers of the carrier. In addition, the carrier may be suppressed or directly modulated as well. Each UW is effectively carried on a subcarrier frequency. When the frequency is estimated as described above, the frequency represents an offset from the subcarrier frequency that is due to an offset of the carrier frequency. In the case of multiple subcarriers, the final frequency estimate can be determined by averaging the various estimates, weighting the estimates according to signal strength and averaging, selecting the median value, or by selecting the value with the greatest signal strength.

Figure 15:
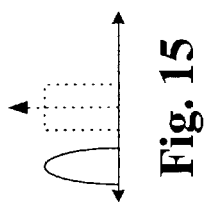
FIG. 15 shows the frequency spectrum of the transmitted input data signal and the frequency passband of the receiver.
Figure 16:
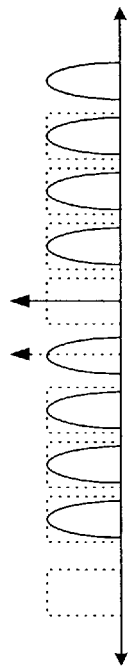
FIG. 16 shows the frequency spectrum of an optical signal with eight subcarriers.

The bandwidth of the input data signal determines the bandwidth of the filters used in the system. With a single data signal modulated on the optical carrier, if the frequency variation in the optical source 160 is greater than the data signal bandwidth, then the input data signal may be outside of the bandwidth of the receiver as shown in FIG. 15. FIG. 15 shows the frequency spectrum of the transmitted input data signal and the frequency passband of the receiver. In this case, the input data signal is not detected at all, and the frequency estimate can not be made. Even if the frequency variation in the optical source 160 is less than the bandwidth of the input data signal, the signal may not be detected or may be degraded. A similar situation arises if sidebands are used. FIG. 16 shows the frequency spectrum of an optical signal with eight subcarriers. Also shown are the eight receiver filter passbands used to separate the signals. In this case, the data frequency spectrum is skewed and various subcarriers cross over into the receive bands of other subcarriers as shown. Only six of the subcarriers may be detected by the receiver. It is also possible for the frequency offset between the transmit and receive optical sources 160 to be large enough so that none of the subcarriers fall within the receive filters and therefore, none of the subcarriers are detected. This problem may be solved by scanning the optical source 160 over a frequency range until the UW's are detected.

Figure 17:
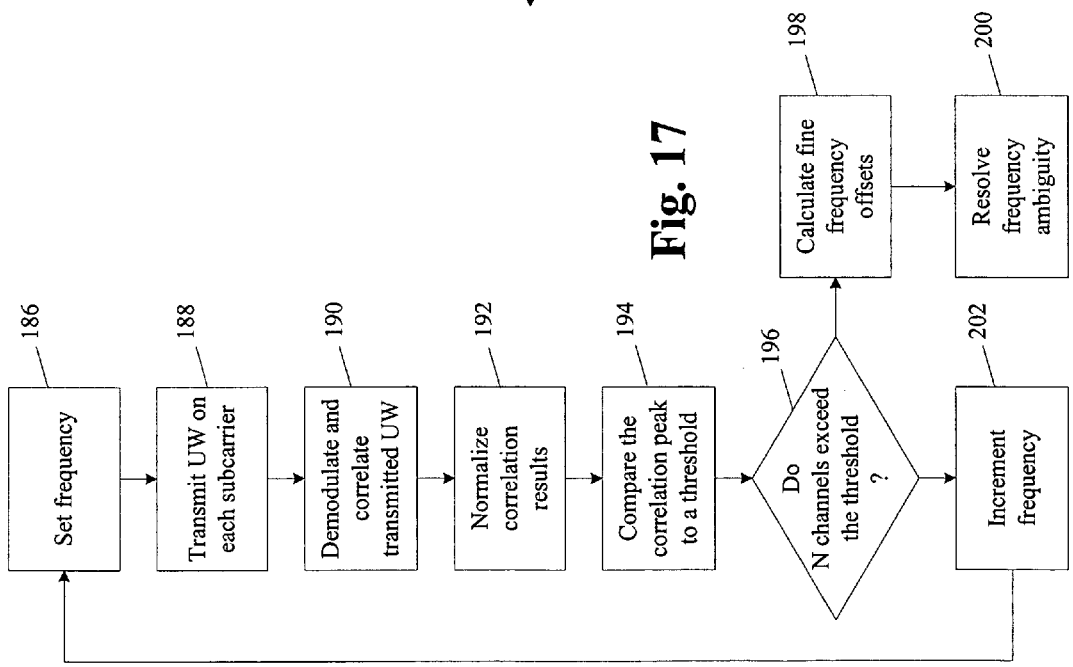
FIG. 17 is a flowchart showing how the system may operate to estimate the receive optical source frequency offset.

FIG. 17 is a flowchart showing how the system 10 may operate to estimate the receive optical source 160 frequency offset. First, the receive optical source 160 is set to a start frequency 186. Next, the system transmits a UW on each carrier and/or subcarrier 188. The demodulator 178 receives and demodulates the transmitted UWs 190, and the UW correlator 182 correlates the demodulated UWs. The system then normalizes the correlation results 192 and compares them to a threshold 194. If N of the carrier/subcarriers exceeds a threshold 196, then the fine frequency offsets are calculated as described above 198. For example, N may be selected to be a majority of the subcarriers. Next, the frequency ambiguity is resolved 200. Otherwise, the optical source 160 frequency is incremented 202 and the process is repeated.

The frequency scanning begins 186 by setting the receive optical source 160 to a start frequency. If the process needs to be repeated the frequency of the optical source 160 is incremented. For example, the increment may be one half of the data signal bandwidth, but other values may also be used.

As described above, a UW is transmitted 188 on each subcarrier in the system 10 along the optical path 12. The UW is coherently demodulated 190 and then sampled by the ADC into I and Q digital signals. These digital signals are then correlated 190.

After the UW is received and correlated 190, the system may normalize the results 192. This may be done by the UW correlator 182, or by a separate normalizer. The correlation results are normalized to the total received energy, allowing for the use of a single threshold for detection. The normalization may be accomplished, for example, by constant false alarm rate (CFAR) processing or automatic gain control (AGC). CFAR processing sums the energy received in a frame or portion of a frame and divides the correlated results by that value. With AGC, the signal level is monitored and the level of gain applied by the AGC adjusted accordingly. The AGC may occur in hardware in the optical or electrical domain or it may be implemented in the signal processing.

The peak correlator value is determined and compared to a threshold for each subcarrier 194. If the peak value exceeds the threshold for a subcarrier then a UW detection occurs. A coarse frequency lock is obtained if N of the UW's are detected 196. Once this occurs, the system calculates the fine frequency offsets as described above 198. If there is more than one carrier/subcarrier, then there may still be an ambiguity in the coarse frequency estimate. For example, in FIG. 16, the received subcarriers are offset from the receiver passband by one increment of the subcarrier spacing. Therefore the frequency estimate may be calculated 200 as $$f = F_{SET} - F_{coarse} + F_{fine}$$

where $F_{set}$ is the currently selected optical source frequency, $F_{coarse}$ is the coarse offset of the optical source that is the spacing between the subcarriers in the present example, and $F_{fine}$ is the frequency offset calculated as described above. The value of $F_{coarse}$ may be determined, for example, by using a table lookup. A bit is assigned to each subcarrier and is assigned a 1 if there is a detection in that subcarrier and a 0 otherwise. This series of bits is used to index into a table of values for $F_{coarse}$.

At this point the system has an estimate of the optical source frequency. The difference between the commanded frequency and the estimated receive optical source 160 frequency can be used by the AFC 173 to command the optical source to the desired transmit frequency, and the system 10 may begin transmitting payload data. Also, the system 10 may set the optical source frequency based upon the estimate and then transmit another UW to verify the setting. In addition, during the transmission of the payload data, from time to time the system will transmit a UW and estimate the optical source frequency. This estimate will be used to correct any frequency drift in the optical source.

The UW used for frequency estimation may also be used to estimate timing offsets in the system. For example, the system may split the received optical signal into two polarization components prior to the conversion to an electrical signal. Each polarization signal is received and demodulated into an electrical signal. After processing the polarization signals are combined. The timing between the two polarization signals may become skewed. Therefore the UW may be sent and processed for each polarization and the timing skew may be estimated. This estimate may then be used to realign the polarization signals prior to combining the signals.

Figure 18:
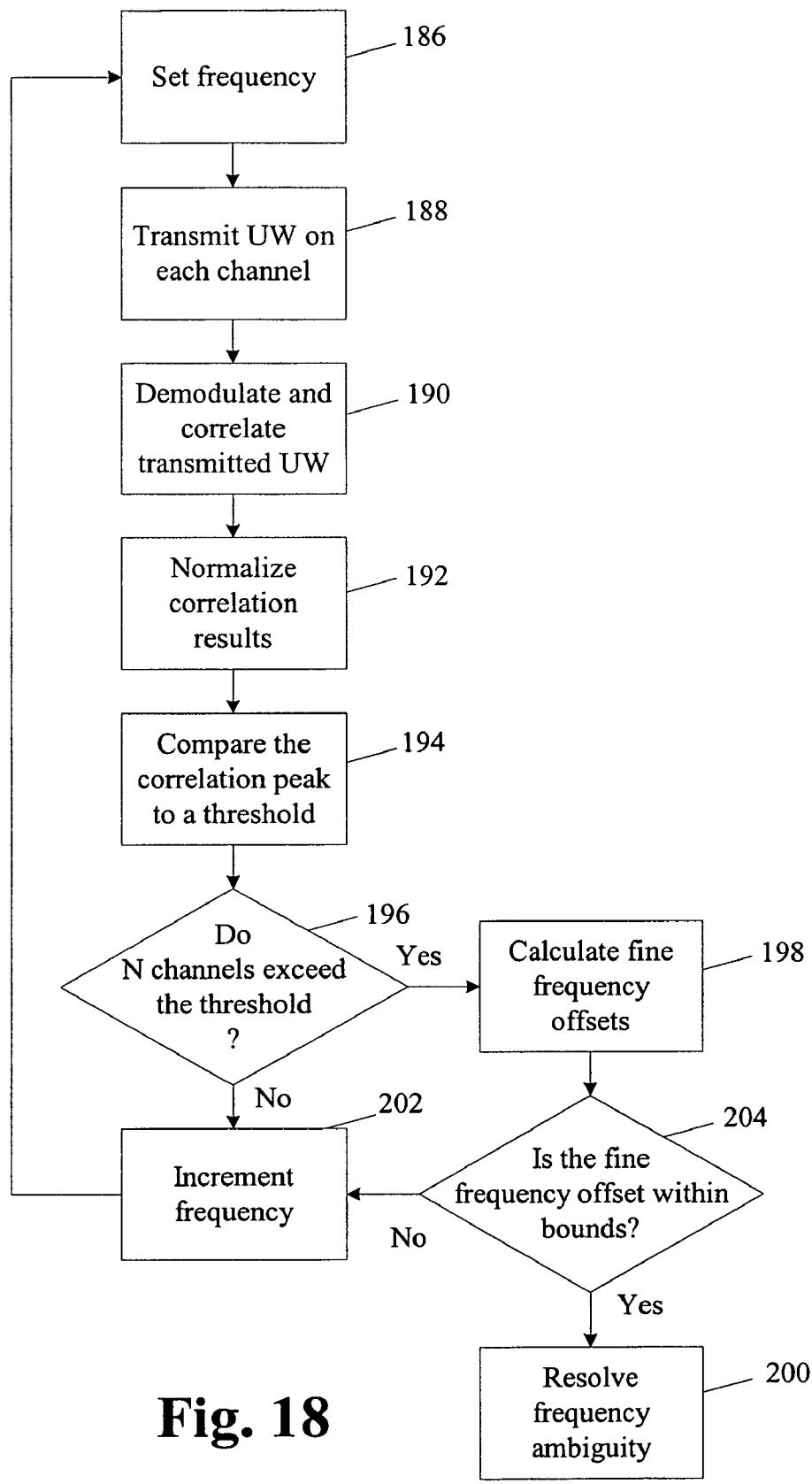
FIG. 18 is a flowchart showing another method of how the system may be used to estimate the optical source frequency.

FIG. 18 is a flowchart showing another method of how the system 10 may be used to estimate the optical source 160 frequency. The process is the same as that described in FIG. 17, but with an additional step 204. After the fine frequency offsets are calculated 198, the fine frequency offsets may be checked to see if they are within bounds 204. For example, a large frequency offset may be rejected in favor of trying an additional coarse frequency increment. Also, if multiple fine frequency offsets are calculated for each of the subcarriers and the variation between the different calculated frequency offsets is too large, then the next frequency increment may be selected 202.

Many variations and modifications can be made to described embodiments of the invention without departing from the scope of the invention. For example, advantages of the present invention may be realized in a DWDM system wherein each wavelength is dispersion compensated as described above. The present invention may also be used to compensate groups of wavelengths based upon the dispersion estimate in a single channel. The modulation, demodulation, and processing of the optical signal may be non-coherent instead of coherent. This may require the uses of nonlinear dispersion compensation. Another example of variations possible with the present invention include a WDM system with many optical carriers each transmitting data as described above. In addition, advantages of the present invention may be realized using different numbers of subcarriers and different data rates on each subcarrier resulting in different numbers of signals to be processed and the associated processing elements. Various levels of oversampling of the converted signal may be used including no oversampling at all. In addition, the system may operate without separating the optical signal into separate polarization components. Also, coherent or non-coherent transmission, reception, and processing may be used in the system. The system may also operate without or with any combination of frequency estimation, dispersion estimation, and timing estimation.

Additional advantages of the present invention may be realized in a DWDM system wherein each wavelength is frequency compensated as described above. Other variations, modifications, and combinations are taught and suggested by the present invention, and it is intended that the foregoing specification and the following claims cover such variations, modifications, and combinations.

The invention claimed is:

1. An optical transmission system, comprising: first and second electrical differential phase-modulation subcarrier modulators, each having a signal input and a modulated output;

an optical modulator having first and second inputs connected to the outputs of the first and second electrical modulators, and having an optical output;

an optical splitter having an input and first and second outputs;

an optical path connecting the output of the optical modulator and the input of the optical splitter;

first and second sub-carrier filters having inputs connected to the first and second outputs, respectively, of the optical splitter, and wherein the first and second filters each include a pass band and a block band, wherein the pass band of the first filter corresponds to the block band of the second filter, and wherein the first and second filters each include an output;

first and second optical receivers having input connected to the outputs of the first and second filters, respectively, and wherein each of the optical receivers has a horizontal signal polarization output and a vertical signal polarization output;

a first set of sub carrier electrical receivers, each having an input connected to the output of the first optical receiver and having a plurality of outputs producing demodulated baseband signals;

a second set of subcarrier electrical receivers, each having an input connected to the output of the second optical receiver and having a plurality of outputs producing demodulated baseband signals;

a first set of analog-to-digital converters having a plurality of inputs connected to the outputs of the first set of subcarrier electrical receivers and having an output;

a second set of analog-to-digital converters having a plurality of inputs connected to the outputs of the second set of subcarrier electrical receivers and having an output;

a first signal processor having a plurality of inputs connected to the outputs of the first set of analog to digital converters and having at least one output; and a second signal processor having a plurality of inputs connected to the outputs of the second set of analog to digital converters and having at least one output.

2. The system of claim 1, wherein:

the first signal processor includes:

a first interpolator, a first dispersion compensator, and a first phase state detector series-connected with a horizontal polarization signal input of the first signal processor;

a second interpolator, a second dispersion compensator, and a second phase state detector series-connected with a vertical polarization signal input of the first signal processor; and a signal combiner having a first input connected to the output of the series-connected first interpolator, a first dispersion compensator, and a first phase state detector, having a second input connected to the output of the series-connected second interpolator, second dispersion compensator, and second phase state detector, and having an output; and wherein the second signal processor includes:

a first interpolator, a first dispersion compensator, and a first phase state detector series-connected with a horizontal polarization signal input of the second signal processor, and a second interpolator;

a second dispersion compensator, and a second phase state detector series-connected with a vertical polarization signal input of the second signal processor; and a signal combiner having a first input connected to the output of the series-connected first interpolator, a first dispersion compensator, and a first phase state detector, having a second input connected to the output of the series-connected second interpolator, a second dispersion compensator, and a second phase state detector, and having an output.

* * * * *